US012737748B2

(12) United States Patent
Wyatt

(10) Patent No.: US 12,737,748 B2
(45) Date of Patent: Sep. 15, 2026

(54) MULTI-FUNCTION ELECTRONIC PAYMENT CARD AND DEVICE SYSTEM

(71) Applicant: Cardware, Inc., Austin, TX (US)

(72) Inventor: David Wyatt, Austin, TX (US)

(73) Assignee: Cardware, Inc., Austin, TX (US)

( * ) Notice: Subject to any disclaimer, the term of this patent is extended or adjusted under 35 U.S.C. 154(b) by 0 days.

(21) Appl. No.: 18/796,235

(22) Filed: Aug. 6, 2024

(65) Prior Publication Data

US 2024/0394687 A1 Nov. 28, 2024

Related U.S. Application Data

(60) Continuation of application No. 17/741,260, filed on May 10, 2022, now Pat. No. 12,056,684, which is a (Continued)

(51) Int. Cl.
*G06Q 20/34* (2012.01)
*G06K 19/06* (2006.01)
(Continued)

(52) U.S. Cl.
CPC ..... *G06Q 20/341* (2013.01); *G06K 19/06206* (2013.01); *G06K 19/0716* (2013.01);
(Continued)

(58) Field of Classification Search
CPC .... G06Q 20/341; G06Q 20/06; G06Q 20/065; G06Q 20/223; G06Q 20/24;
(Continued)

(56) References Cited

U.S. PATENT DOCUMENTS 5,528,222 A 6/1996 Moskowitz et al.
5,594,233 A 1/1997 Kenneth et al.
(Continued)

FOREIGN PATENT DOCUMENTS

AU 2013209318 2/2014
EP 0949595 10/1999
(Continued)

OTHER PUBLICATIONS

U.S. Appl. No. 14/395,457, filed Dec. 5, 2023, Law et al.
(Continued)

*Primary Examiner* — Seung H Lee

(57) ABSTRACT

A payment card device includes a thin card-shaped payment-card-standard compatible body, a memory, a processor coupled to the memory; and a payment card reader interface. The payment card reader interface includes at least one interface selected from a set of payment-card-standard interfaces consisting of: a smart card reader interface, a magnetic-stripe interface, an RF interface, an NFC interface, a display interface, an information visible on the surface of the payment card device, and a wireless interface. The payment information for a transaction is operable to be conveyed via at least one of the payment-card-standard interfaces, and includes a limited-use payment information. The limited-use payment information is limited to a use only on the selected payment card interface used at a payment card reader facility. The limited-use payment information is invalid in a use other than via the selected payment card interface.

24 Claims, 13 Drawing Sheets

Related U.S. Application Data division of application No. 16/854,829, filed on Apr. 21, 2020, now Pat. No. 11,328,286, which is a continuation of application No. 16/025,829, filed on Jul. 2, 2018, now Pat. No. 10,628,820, which is a continuation of application No. 15/250,698, filed on Aug. 29, 2016, now Pat. No. 10,013,693, which is a continuation of application No. 14/680,946, filed on Apr. 7, 2015, now Pat. No. 9,430,765, which is a continuation of application No. 14/217,261, filed on Mar. 17, 2014, now Pat. No. 9,022,286.

(60) Provisional application No. 61/794,891, filed on Mar. 15, 2013.

(51) Int. Cl.

| | |
|---|---|
| ***G06K 19/07*** | (2006.01) |
| ***G06K 19/077*** | (2006.01) |
| ***G06Q 20/06*** | (2012.01) |
| ***G06Q 20/22*** | (2012.01) |
| ***G06Q 20/24*** | (2012.01) |
| ***G06Q 20/38*** | (2012.01) |
| ***G06Q 20/40*** | (2012.01) |
| ***G07F 7/08*** | (2006.01) |
| ***G07F 19/00*** | (2006.01) |

(52) U.S. Cl.
CPC ....... *G06K 19/07749* (2013.01); *G06Q 20/06* (2013.01); *G06Q 20/065* (2013.01); *G06Q 20/223* (2013.01); *G06Q 20/24* (2013.01); *G06Q 20/346* (2013.01); *G06Q 20/347* (2013.01); *G06Q 20/352* (2013.01); *G06Q 20/3827* (2013.01); *G06Q 20/385* (2013.01); *G06Q 20/4012* (2013.01); *G06Q 20/409* (2013.01); *G07F 7/0873* (2013.01); *G07F 19/00* (2013.01)

(58) Field of Classification Search
CPC .. G06Q 20/346; G06Q 20/347; G06Q 20/352; G06Q 20/3827; G06Q 20/385; G06Q 20/4012; G06Q 20/409; G06K 19/06206; G06K 19/0716; G06K 19/07749; G07F 7/0873; G07F 19/00
See application file for complete search history.

(56) References Cited

U.S. PATENT DOCUMENTS 5,744,787 A 4/1998 Teicher
5,883,810 A 3/1999 Franklin et al.
5,903,721 A 5/1999 Sixtus
5,963,924 A 10/1999 Williams et al.
6,005,942 A 12/1999 Chan et al.
6,076,075 A 6/2000 Teicher
6,105,008 A 8/2000 Davis et al.
6,119,946 A 9/2000 Teicher
6,233,683 B1 5/2001 Chan et al.
6,282,522 B1 8/2001 Davis et al.
6,330,978 B1 12/2001 Molano et al.
6,450,407 B1 9/2002 Freeman et al.
6,481,632 B2 11/2002 Wentker et al.
6,748,367 B1 6/2004 Lee et al.
6,776,332 B2 8/2004 Allen et al.
6,938,484 B2 9/2005 Najafi et al.
7,004,385 B1 2/2006 Douglass
7,127,236 B2 10/2006 Khan et al.
7,177,848 B2 2/2007 Hogan et al.
7,258,012 B2 8/2007 Xie
7,280,096 B2 10/2007 Marvit
7,580,898 B2 8/2009 Brown et al.
7,593,000 B1 9/2009 Chin
7,725,369 B2 5/2010 Shiftan et al.
7,740,168 B2 6/2010 Hammad et al.
7,793,851 B2 9/2010 Mullen
7,907,838 B2 3/2011 Nasiri
7,908,216 B1 3/2011 Davis et al.
8,052,052 B1 11/2011 Power
8,095,113 B2 1/2012 Kean et al.
8,103,588 B2 1/2012 Patterson
8,127,999 B2 3/2012 Diamond
8,255,323 B1 8/2012 Casey et al.
8,341,557 B2 12/2012 Pisula et al.
8,351,910 B2 1/2013 Horodezky et al.
8,423,462 B1 4/2013 Amacker et al.
8,646,059 B1 2/2014 von Behren et al.
8,892,390 B2 11/2014 MacGougan et al.
8,909,138 B2 12/2014 Rhelimi
8,930,274 B1 1/2015 Brickell et al.
8,952,832 B2 2/2015 Nasiri et al.
9,008,616 B2 4/2015 Wall et al.
9,256,871 B2 2/2016 Anderson et al.
9,600,808 B1 3/2017 Gomez, Sr. et al.
9,619,741 B1 4/2017 Rigatti
9,619,799 B2 4/2017 Haggerty et al.
9,721,319 B2 8/2017 Smets et al.
9,898,728 B2 2/2018 Brudnicki et al.
10,121,144 B2 11/2018 Khan
10,181,121 B2 1/2019 Roberts et al.
10,380,573 B2 8/2019 Lin et al.
10,445,723 B2 10/2019 Laracey
10,510,056 B2 12/2019 Carter et al.
10,628,820 B2 4/2020 Wyatt
10,861,090 B2 12/2020 Haggerty et al.
11,042,846 B2 6/2021 Dicker et al.
11,068,875 B2 7/2021 Khan et al.
11,176,538 B2 11/2021 Wyatt
11,328,286 B2 5/2022 Wyatt
11,392,937 B2 7/2022 Dicker et al.
11,620,634 B2 4/2023 Wyatt
2002/0174075 A1 11/2002 Mirlas et al.
2003/0222152 A1 12/2003 Boley, Jr.
2004/0127256 A1 7/2004 Goldthwaite et al.
2005/0043997 A1 2/2005 Sahota et al.
2005/0252961 A1 11/2005 Rasti
2006/0097991 A1 5/2006 Hotelling et al.
2006/0122931 A1 6/2006 Walker et al.
2006/0186195 A1 8/2006 Gray
2007/0045403 A1 3/2007 Slonecker, Jr.
2007/0055630 A1 3/2007 Gauthier et al.
2007/0076923 A1 4/2007 Chiu
2007/0095892 A1 5/2007 Lyons et al.
2007/0114274 A1 5/2007 Gibbs et al.
2007/0208671 A1 9/2007 Brown et al.
2007/0244811 A1 10/2007 Tumminaro
2007/0265984 A1 11/2007 Santhana
2007/0278291 A1 12/2007 Rans et al.
2008/0017704 A1 1/2008 VanDeburg et al.
2008/0040285 A1 2/2008 Wankmueller
2008/0078831 A1 4/2008 Johnson et al.
2008/0110983 A1 5/2008 Ashfield
2008/0122796 A1 5/2008 Jobs et al.
2008/0172317 A1 7/2008 Deibert et al.
2008/0222047 A1 9/2008 Boalt
2008/0275779 A1 11/2008 Lakshminarayanan
2008/0319905 A1 12/2008 Carlson
2009/0030845 A1 1/2009 Hurry et al.
2009/0070272 A1 3/2009 Jain
2009/0083850 A1 3/2009 Fadell et al.
2009/0144161 A1 6/2009 Fisher
2009/0159700 A1* 6/2009 Mullen ............ G06K 19/07749
235/493
2009/0200371 A1 8/2009 Kean et al.
2009/0210308 A1 8/2009 Toomer et al.
2009/0276347 A1 11/2009 Kargman
2009/0291634 A1 11/2009 Saarisalo
2009/0307132 A1 12/2009 Phillips
2009/0320123 A1 12/2009 Yu et al.
2010/0078471 A1 4/2010 Lin et al.
2010/0078472 A1 4/2010 Lin et al.
2010/0082445 A1 4/2010 Hodge et al.

(56) References Cited

U.S. PATENT DOCUMENTS

2010/0082481 A1 4/2010 Lin et al.
2010/0082490 A1 4/2010 Rosenblatt et al.
2010/0088227 A1 4/2010 Belamant
2010/0125508 A1 5/2010 Smith
2010/0125509 A1 5/2010 Kranzley et al.
2010/0127083 A1 5/2010 Brown et al.
2010/0185545 A1 7/2010 Royyuru et al.
2010/0217709 A1 8/2010 Aabye et al.
2011/0010277 A1 1/2011 Enzaldo
2011/0022472 A1 1/2011 Zon
2011/0070826 A1 3/2011 Griffin et al.
2011/0078031 A1 3/2011 Mardikar et al.
2011/0082772 A1 4/2011 Hirson
2011/0101093 A1 5/2011 Ehrensvärd
2011/0112918 A1 5/2011 Mestré et al.
2011/0140841 A1 6/2011 Bona et al.
2011/0153498 A1 6/2011 Makhotin et al.
2011/0173060 A1 7/2011 Gallagher
2011/0173121 A1 7/2011 Kawan
2011/0184867 A1 7/2011 Varadarajan
2011/0191161 A1 8/2011 Dai
2011/0191177 A1 8/2011 Blackhurst et al.
2011/0238573 A1 9/2011 Varadarajan
2011/0282785 A1 11/2011 Chin
2012/0011058 A1 1/2012 Pitroda et al.
2012/0116902 A1 5/2012 Cardina et al.
2012/0116976 A1 5/2012 Cardina et al.
2012/0123937 A1 5/2012 Spodak
2012/0143754 A1 6/2012 Patel
2012/0148115 A1 6/2012 Birdwell et al.
2012/0150687 A1 6/2012 Hart
2012/0150750 A1 6/2012 Law
2012/0169593 A1 7/2012 Mak et al.
2012/0191612 A1 7/2012 Spodak et al.
2012/0191615 A1 7/2012 Shibuk
2012/0197691 A1 8/2012 Grigg et al.
2012/0205443 A1 8/2012 Routhenstein et al.
2012/0206406 A1 8/2012 Kim et al.
2012/0290449 A1 11/2012 Mullen et al.
2012/0310760 A1 12/2012 Phillips et al.
2013/0013499 A1 1/2013 Kalgi
2013/0024371 A1 1/2013 Harraman et al.
2013/0036050 A1 2/2013 Gordano et al.
2013/0054474 A1 2/2013 Yeager
2013/0068366 A1 3/2013 Eng
2013/0087627 A1 4/2013 Marseille et al.
2013/0097040 A1 4/2013 Fisher
2013/0151292 A1 6/2013 Van Deloo et al.
2013/0159186 A1 6/2013 Brudnicki et al.
2013/0166441 A1 6/2013 Kobylkin et al.
2013/0232083 A1 9/2013 Smith et al.
2013/0262317 A1 10/2013 Collinge et al.
2013/0297509 A1 11/2013 Sebastian et al.
2014/0006276 A1 1/2014 Grigg et al.
2014/0019367 A1 1/2014 Khan et al.
2014/0229375 A1 8/2014 Zaytzsev et al.
2014/0310113 A1 10/2014 Sengupta et al.
2014/0344153 A1 11/2014 Raj et al.
2015/0058191 A1 2/2015 Khan et al.
2015/0073983 A1 3/2015 Bartenstein et al.
2015/0134540 A1 5/2015 Law et al.
2015/0178724 A1 6/2015 Ngo et al.
2015/0180836 A1 6/2015 Wong et al.
2015/0348002 A1 12/2015 Van Os et al.
2016/0042356 A1 2/2016 Jakobson et al.
2016/0057619 A1 2/2016 Lopez
2016/0253669 A1 9/2016 Yoon et al.
2016/0275505 A1 9/2016 Salian et al.
2016/0321653 A1 11/2016 Jacobs et al.

FOREIGN PATENT DOCUMENTS

EP 1 004 992 5/2000
EP 1 223 565 7/2002
EP 2 302 882 3/2011
EP 2 407 919 1/2012
JP 2004-13728 1/2004
KR 20110039946 4/2011
KR 20120076502 7/2012
WO 94/17498 8/1994
WO 2009082760 7/2009
WO 2010/037218 A1 4/2010
WO 2010/039337 4/2010
WO 2012/011054 1/2012
WO 2012/042262 4/2012
WO 2012042262 A1 4/2012
WO 2012/154915 11/2012
WO 2013/155627 10/2013

OTHER PUBLICATIONS

Visa Token Service—Product Fact Sheet 2022 Visa; 2 pages.
Visa Token Service—Visa 2025; 7 pages.
Visa Token Service Momentum, Annual Update 2022; Visa; 2 pages.
What is Venmo, how does it work, and is it safe to use? May 31, 2024 Ben Luthi Yahoo Finance; 6 pages.
What is Venmo: How it Works May 18, 2023; Nicole Symon; 9 pages.
What is Venmo?—NerdWallet Jun. 24, 2024; Chanelle Bessette; 7 pages.
Google Wallet and the New Retail Ecosystem Oct. 3, 2011 David W. Schropfer; 3 pages.
Government Smart Card Handbook Feb. 2004 GSA; 262 pages. (Uploaded as Prt1 and Prt2).
Implementing Electronic Card Payment Systems 2003 Cristian Radu; 49 pages.
Java Card for ePayment Applications 2002 Vesna. Hassler; 40 pages.
Java Card Platform: A Week in the Life of Jack Link 2004 Sun Microsystems; 6 pages.
Java Card Questions and Answers with Zhiqun Chen Oct. 2000 Ed Ort Sun Microsystems; 4 pages.
Java Card Technology Datasheet 2005 Sun Microsystems; 3 pages.
Java Card Technology Examples 2004 Sun Microsystems.
Java Card Technology FAQs 2005 Sun Microsystems; 3 pages.
Venmo; Just say "Venmo Me"; 2021; 24 pages.
Java Card Technology for Smart Cards: Architecture and Programmer's Guide Book information Zhiqun Chen Sun Microsystems; 36 pages. Year 2000; date unkown.
Java Card1_Fig-12 2006 Sun.com; 1 page.
Java Card1_Fig-3 2005 Sun.com; 1 page.
Java Card1_Fig-4 2005 Sun.com; 1 page.
Java Card1_Fig-5 2006 Sun.com; 1 page.
Java Card1_Fig-7 2004 Sun.com; 1 page.
Java Card1_Fig-9 2004 Sun.com; 1 page.
Java on Smart Cards: Programming and Security: First International Workshop, JavaCard 2000; Isabelle Attali, Jefferson Jensen; 25 pages.
JavaCard—From Hype to Reality 1999 Michael Baentsch; IEEE; 8 pages.
JavaCard—Redistribution and Use in Source and Binary Forms License 2004 Sun Microsystems; 5 pages.
JCOP V2.4.1 Secure Smart Card Controller, Rev. 3.2 Sep. 2, 2009;NXP; 18 pages.
JCOP20 Technical Brief, Revision 2.3; IBM; 9 pages; Feb. 2002.
JCOP30 Technical Brief, Revision 2.3; 9 pages; Feb. 2002.
MagTek CEO: "Dynamic Data is the Core of Security" [Transcript] Mar. 8, 2012 David Evans; Payments; 11 pages.
MagTek Introduces Qwick Code Mobile Wallet Jan. 15, 2012; 1 page.
MagTek Launches QwickPAY, the Innovative Secure Mobile Payments Service, Into the Android Marketplace Mar. 29, 2011 Magtek; 1 page.
Visa Invests in Authentication Outfit Emue Nov. 18, 2009 Finextra; 2 pages.
Visa CodeSure Gets Commercial Green Light; Jun. 2, 2010; Finextra; 3 pages.

(56) References Cited

OTHER PUBLICATIONS

Mastercard Virtual Card Tokens; Mar. 7, 2025; Mastercard; 1 page.
MDES Token Connect | Mastercard Developers; Mastercard; 1 page; Apr. 2, 2025.
Mobile Payment Services in South Africa; Jan. 31, 2013; Matthias Beland; 124 pages.
NXP—News Center—Infocus Archive 2006 NXP; 4 pages; Oct. 22, 2024.
One-Click Payments by 2030 With Tokenization; Mar. 12, 2025 Jorn Lambert; Mastercard; 4 pages.
PCI—Payment Card Industry (PCI) Data Security Standard, Version 2.0 Oct. 2010 PCI; 75 pages.
PCI Data Security Standard (PCI DSS), Version 2.0 Aug. 2011 Scoping SIG, Tokenization Taskforce PCI Security Standards Council; 23 pages.
PHB Development, Kurt Salmon, "Mobile Payments . . . a "Southern" Revolution!" 2011 PHB Development; 63 pages.
Visa Best Practices for Tokenization Version 1.0 Jul. 14, 2010 Visa Best Practices; 4 pages.
Qwick Codes Mobile Wallet for IOS CNET; 2005; 11 pages.
Visa and Emue Technologies deploy cards with built-in one-time password generator Feb. 9, 2009 Finextra; 1 page.
Techie Visa Card Features Buttons and Screen to Generate CCV Dynamically Nov. 11, 2008 Mark Wilson; 1 page.
The Complete Guide to Payments Tokenization; 3 pages; Apr. 2, 2025.
Venmo, Just Say "Venmo Me" 2021 Venmo; 24 pages.
U.S. Appl. No. 61/899,734, filed Nov. 4, 2013; Inventor Ahmer A. Khan; 40 pages.
U.S. Appl. No. 61/905,035; Inventor George R. Dicker; et al; Nov. 15, 2013; 58 pages.
U.S. Appl. No. 61/921,688, filed Dec. 30, 2013; Inventor Ahmer A. Khan; 54 pages.
"A Primer to the Implementation of Smrt Card Management and Related Systems," Version 1.0 Aug. 2000 GlobalPlatform; 47 pages.
"An Introduction to Java Card Technology—Part 1" May 29, 2003 C. Enrique Ortiz Sun Developer Network; 16 pages.
"An Introduction to Java Card Technology—Part 2, The Java Card Applet" Sep. 2003 C. Enrique Ortiz Sun Developer Network; 13 pages.
"An Introduction to Java Card Technology—Part 3, The Smart Card Host Application" Sep. 2003 C. Enrique Ortiz Sun Developer Network; 11 pages.
"An Investigation into Electronic Commerce Frauds and their Security Implications" Nov. 7, 2004 Kevin Boardman; 67 pages.
"Contactless Payment Security Questions & Answers" 2016 Smart Card Alliance, Inc.; 4 pages.
"EMV Card Personalization Specification," Version 1.0 Jun. 2003 EMVCo, LLC; 81 pages.
"EMV Integrated Circuit Card Specifications for Payment Systems," Book 1, Application Independent ICC to Terminal Interface Requirements, Version 4.Nov. 3, 2011 EMVCo, LLC; 189 pages.
"EMV Integrated Circuit Card Specifications for Payment Systems," Book 2, Security and Key Management, Version 4.1 May 2004 EMVCo, LLC; 187 pages.
"EMV Integrated Circuit Card Specifications for Payment Systems," Book 2, Security and Key Management, Version 4.3 Nov. 2011 EMVCo, LLC; 174 pages.
"EMV Integrated Circuit Card Specifications for Payment Systems," Book 3, Application Specification, Version 4.1 May 2004 EMVCo, LLC; 237 pages.
"EMV Integrated Circuit Card Specifications for Payment Systems," Book 3, Application Specification, Version 4.. Nov. 2011 EMVCo, LLC; 230 pages.
"EMV Integrated Circuit Card Specifications for Payment Systems," Book 4, Cardholder, Attendant, and Acquirer Interface Requirements, Version 4.3 Nov. 2011 EMVCo, LLC; 154 pages.
"Interoperability in Electronic Payments: Lessons and Opportunities" 2012 Carol Coye Benson CGAP; 46 pages.
"Investigating Mobile Payment: Supporting Technologies, Methods, and Use" 2005 Valcourt, et al.; IEEE; 8 pages.
"Java Card™ 2.2 Off-Card Verifier" White Paper Jun. 2002 Sun Microsystems; 24 pages.
"Java Card™ Platform Security" Technical White Paper 2001 Sun Microsystems; 26 pages.
"Radio-Frequency Identification (RFID): A Focus on Information Security and Privacy," OECD Digital Economy Papers, No. 138 Jan. 14, 2008 OECD Publishing; 71 pages.
"SE vs. HCE: What is More Secure for NFC Mobile Payments?" Oct. 17, 2014 Finextra; 6 pages.
About Us | Venmo 2012 Venmo.com.
Apple Press Release: "Apple Announces Apple Pay" Sep. 9, 2014 Apple; 4 pages.
GlobalPlatform Technical Overview Jan. 22, 2003 Marc Kekiheff GlobalPlatform; 9 pages.
E-ink on Credit Cards will do Away with PINs (video) Sep. 2, 2011 The Digital Reader; 6 pages.
Emue—a Revolution in Authentication May 13, 2009 EMUE; 1 page.
For Businesses: Payment Technologies—Products & Platforms 2004 Visa; 3 pages.
For Businesses: Payment Technologies—Visa Cash 2004 Visa; 1 page.
For Businesses: Payment Technologies—Visa Smart debit and Visa Smart Credit 2004 Visa; 2 pages.
GlobalPlatform—Implementations—Financial 2006 GlobalPlatform; 7 pages.
GlobalPlatform—Implementations—Mobile Telecom 2006 GlobalPlatform; 3 pages.
GlobalPlatform—Implementations—Retail 2006 GlobalPlatform; 1 page.
GlobalPlatform—Implementations—Transit 2006 GlobalPlatform; 2 pages.
GlobalPlatform—Interoperability and Security with GlobalPlatform Feb. 2, 2004 Marc Kekiheff GlobalPlatform; 70 pages.
GlobalPlatform—Overview Jun. 2004 GlobalPlatform; 38 pages.
GlobalPlatform—The Cross-Industry Approach to Smart Card Standards 2000 GlobalPlatform; 3 pages.
GlobalPlatform: a Dynamic and Secure Pre and Post Issuance Solution—Cartes 2002 2002 Marc Kekiheff GlobalPlatform; 28 pages.
GlobalPlatform Card Security Requirements Specification Jan. 22, 2003 Marc Kekiheff GlobalPlatform; 13 pages.
GlobalPlatform Card Specification Tutorial Jan. 22, 2003 Marc Kekiheff GlobalPlatform; 40 pages.
GlobalPlatform Specifications Archive—Technology Document Library 2024 GlobalPlatform; 12 pages.
TPM Mobile with Trusted Execution Environment for Comprehensive Mobile Device Security, Jun. 2012; 6 pages.
MagTek, Magnetic Stripe Card Standards, (MagTek Inc. eds., 2011); 2 pages.
EMVco, LLC, EMV Integrated Circuit Card Specifications for Payment Systems: Book 2—Security and Key Management (EMVCo, LLC eds., Version 4.3 2011); 174 pages.
Klaus Finkenzeller, RFID Handbook (John Wiley & Sons, 3rd ed. 2010); 480 pages.
Smart Card Alliance, EMV and NFC: Complementary Technologies that Deliver Secure Payments and Value-Added Functionality (Smart Card Alliance, Inc. eds., 2012); 15 pages.
Mastercard, MasterCard Approved Mobile Devices, Mastercard (Aug. 3, 2012), http://www.mastercard-mobilepartner.com/docs/MasterCard_Approved_Mobile_Devices.pdf, [ https://web.archive.org/web/20120906234255/http://www.mastercard-mobilepartner.com:80/docs/MasterCard_Approved_Mobile_Devices.pdf; 1 page.
EMVco, LLC, EMV Chip At-a-Glance: Enabling Seamless and Secure Contact and Contactless Payments Around the World, EMVCO (2002), https://www.emvco.com/wp- content/uploads/2022/09/EMV%C2%AE-Chip-At-A-Glance-EMVCo-eBook.pdf: 11 pages.
Scoping SIG & Tokenization Taskforce PCI Security Standards Council, PCI Data Security Standard (PCI DSS)—Information Supplement: PCI DSS Tokenization Guidelines (PCI Security Standards Council eds., Version 2.0) Year 2011.

(56) References Cited

OTHER PUBLICATIONS

Alessandro Vizzarri et al., Security in Mobile Payments (2013): 6 pages.
"The Electronic Purse", John Wenninger and David Laster, Federal Reserve Bank of New York, 1995 https://www.newyorkfed.org/medialibrary/media/research/current_issues/ci1-1.pdf [https://web.archive.org/web/20170502002450/https://www.newyorkfed.org/medialibrary/media/research/current_issues/ci1-1.pdf]: 6 pages.
U.S. Appl. No. 61/619,095 to Collinge et al.
U.S. Appl. No. 61/635,248 to Collinge et al.
U.S. Appl. No. 61/735,383 to Collinge et al.
U.S. Appl. No. 61/762,098 to Collinge et al.
Ann Cavoukian, Mobile Near Field Communications (NFC) "Tap 'n Go" Keep it Secure & Private, IPC (2011), https://www.ipc.on.ca/sites/default/files/legacy/Resources/mobile-nfc.pdf; 22 pages.
Annika Paus, Near Field Communication in Cell Phones; Jul. 24, 2007; 26 pages.
Ashis K. Mahapatra, Touch Screen Systems, Orissa Review (2005), https://magazines.odisha.gov.in/orissareview/jun2005/engpdf/touch_screen_system.pdf; 5 pages.
Anup K. Ghosh & Tara M. Swaminatha, Software Security and Privacy Risks in Mobile E-Commerce, 44 CACM 51 (2001); 7 pages/.
1747.09 Printing credit or debit card receipts; restrictions, CA Civil, Jan. 2009; 2 pages.
Vedat Coskun, Near Field Communication: Theory to Practice (John Wiley & Sons, 1st ed. 2012); 31 pages.
The 2013 Federal Reserve Payments Study; Recent and Long-Term Trends in the United States: 2000-2012 Detailed Report and Updated Data Release; Federal Reserve System; Jul. 2014; 191 Pages.
The 2013 Federal Reserve Payments Study; Recent and Long-Term Payment Trends in the United States: 2003-2012; Summary Report and Initial Data Release;43 Pages.
Over-the-air Deployment of Applications in Multi-Platform Environments; Tore Fjellheim; Queensland University of Technology,2006 Australian Software Engineering Conference;10 Pages.
Chapter 12: Hash Functions—The Joy of Cryptography OE (1st); 2017; 23 Pages.
This Month in History: The First CreditCard; By Diane Mclaughlin; Banker & Tradesman Staff | Sep. 25, 2022; 2 Pages.
Consumer World; Two Months After the Deadline, Most Major Retailers Still Can't Read Chipped Credit Cards; Dec. 7, 2015; 1 page.
Tech; Bump Pay Lets you PayPal Someone With a Tap, But Only In-Person; Josh Constine; Mar. 29, 2012; 1 Pages.
Colnect; Bank Card: Bank of America; 2003-2025 colnect.com. 4 Pages.

* cited by examiner 201b
230
Optical sensor array
225
220
207
Memory
209
Coil Interface
215
NFC
260
Motion Detection
210
Processor
205
RFID
265
270
USB
Real-Time Clock
240
Touch Sensor Array
245
Power Source
255
Galvanic sensor
Display
250
235
275
235

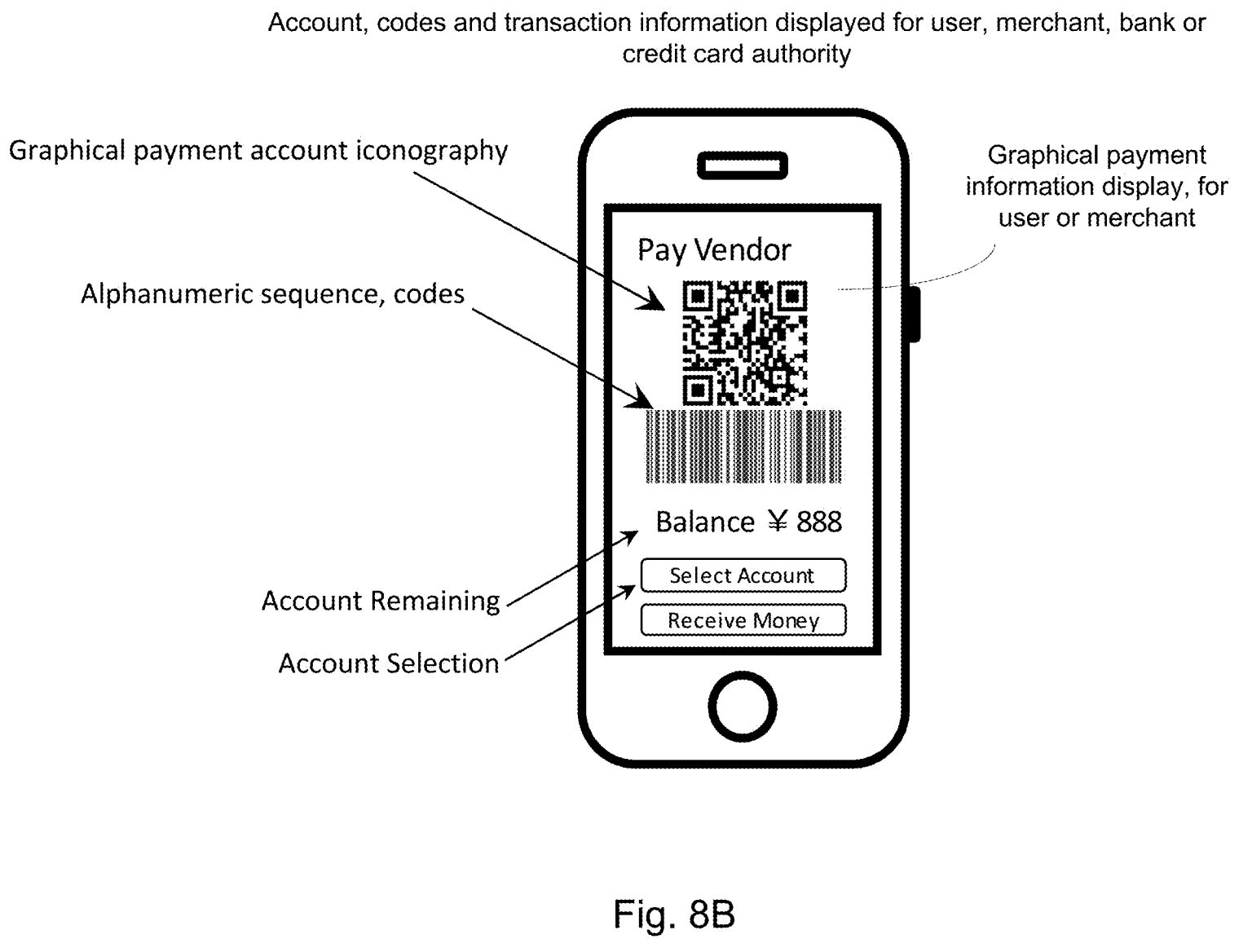

Account, codes and transaction information displayed for user, merchant, bank or credit card authority Graphical payment information display, for user or merchant Pay Vendor Balance ¥ 888

Select Account

Receive Money

Graphical payment account iconography

Alphanumeric sequence, codes

Account Remaining

Account Selection

Fig. 8B

MULTI-FUNCTION ELECTRONIC PAYMENT CARD AND DEVICE SYSTEM

RELATED APPLICATIONS

This is a Continuation application of, commonly owned U.S. patent application Ser. No. 17/741,260, now U.S. Pat. No. 12,056,684, entitled "Multi-Function Electronic Payment Card and Device System," to Wyatt, filed May 10, 2022, which in turn was a Divisional application of, commonly-owned U.S. patent application Ser. No. 16/854,829, now U.S. Pat. No. 11,328,286, entitled "Multi-Function Electronic Payment Card and Device System," to Wyatt, filed Apr. 21, 2020, which in turn was a Continuation application of, commonly-owned U.S. patent application Ser. No. 16/025,829, now U.S. Pat. No. 10,628,820, filed Jul. 2, 2018, which in turn was a Continuation application of, commonly-owned U.S. patent application Ser. No. 15/250,698, now U.S. Pat. No. 10,013,693, filed Aug. 29, 2016, which in turn was a continuation of U.S. patent application Ser. No. 14/680,946, now U.S. Pat. No. 9,430,765 entitled "Multi-Functional Credit Card Type Portable Electronic Device," filed Apr. 7, 2015 to inventor David Wyatt, which is itself a continuation of U.S. patent application Ser. No. 14/217,261, now U.S. Pat. No. 9,022,286, similarly entitled "Multi-Functional Credit Card Type Portable Electronic Device," filed Mar. 17, 2014 by the same inventor David Wyatt, and claims the benefit of U.S. Provisional Patent No. 61/794,891 entitled "Multi-Functional Credit Card Device," filed Mar. 15, 2013 to inventor David Wyatt. The benefit of the earlier filing dates is hereby claimed and the contents of the earlier filed related applications are further incorporated by reference herein in their entireties.

FIELD OF THE INVENTION

Embodiments according to the present disclosure generally relate to electronic or smart multi-function electronic devices and, more specifically, to more secure, smart multi-function electronic payment card and device systems and transaction processing thereof.

BACKGROUND OF THE INVENTION

There are several different types of credit cards available in the marketplace at present. A first type of credit card is a conventional, standard piece of plastic with a magnetic strip, which is readily available and in wide commercial use. The advantage of this first type of credit card is that a large portion of the infrastructure for credit card transactions is built around this type of card, and consequently such a card works in a wide array of vendors' credit card machines, automated teller machines (ATMs), and other devices that support the present credit card and banking infrastructure.

Another type of credit card device employs the use of a smart integrated circuit chip. These types of credit cards have a built in microprocessor with cryptographic capabilities. These microprocessors operate in a similar manner to a cell phone having a chip comprising a cryptographic processor. Such a smart card device requires contact with a reader in order to be read and to perform a transaction. The reader provides the manner in which a facility interacts with the built-in processor on the card, e.g., for purposes of performing verification on the authenticity of the card or for making a direct deposit on the card. These credit card devices also comprise a magnetic strip such that they are compatible with standard plastic credit card readers in wide use.

A different type of credit card device in circulation employs radio frequency identification ("RFID"). These cards essentially have a low-power RF antenna built into the card, and when the cardholder passes the antenna in front of a reader comprising an RF field, enough power is generated to enable the processor to interact wirelessly with the receiving device.

A concern with each of these types of credit cards presently available in the marketplace is that they can all be, in various ways, susceptible to theft and/or compromise. Therefore, these types of credit cards have security limitations. Further, cards employing smart integrated circuit chips and RF technology are not in wide use at present because they are incompatible with existing credit card infrastructure, which still predominantly supports conventional plastic credit cards.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with embodiments of the present invention, a payment card device includes a thin card-shaped payment-card-standard compatible body, a memory, a processor coupled to the memory; and a payment card reader interface. The payment card reader interface includes at least one payment card interface selected from a set of payment-card-standard interfaces consisting of: a magnetic-stripe, a smart card reader interface, a magnetic-stripe interface, an RF interface, an NFC interface, a display interface, an information visible on the surface of the payment card device, and a wireless interface.

The payment information for a transaction is operable to be conveyed via at least one of the payment-card-standard interfaces, and includes a limited-use payment information. The limited-use payment information is limited to a use only on the selected payment card interface used at a payment card reader facility. The limited-use payment information is invalid in a use other than via the selected payment card interface, and the limited-use payment information is to be used in place of a payment card issuer payment information for payment transactions by the payment card device at payment card reader facilities.

In accordance with embodiments of the present invention, an electronic device includes a processor, a wireless interface coupled to the processor, and a touch-screen user interface coupled to the processor. The processor is operable to wirelessly receive an information associated with the electronic device via the wireless interface. The processor is further operable to perform a payment issuer-provided security challenge with a user, recognizing said user as a valid cardholder via a user-interface. The processor is further operable to identify a valid user through at least one user-recognition action selected from a set of actions consisting of: responding to a security challenge sent wirelessly from the payment issuer, a touch ID sensor identifying a touch of the valid user, a touch sensor-array receiving a user-entered valid passcode, a key-pad receiving a user-entered valid passcode, a user interface receiving a user entered a valid PIN or Key-Code, a user interface receiving a user entered a valid password, a user interface reading a user swipe or gesture, a user tapping a predetermined sequence on the device, a user motioning the processor in accordance with a sequence of motions, a skin-contact sensing identifying a valid user, a sensor array reading a touch of an identified user, a biometric recognition of a valid user, and a biometric sensing of the processor remaining continuously in the possession of a valid user. The processor is further operable to present a transaction information via the touch-screen interface. The transaction information is selected from a set of payment information consisting of: a transaction time, a transaction amount, a merchant-provided transaction information, a user identifier, a merchant identifier, a transaction location, a transaction facility, an account information, a partial card number, and a graphical image representation of the payment information selected thereof, and, wherein upon recognition of the valid user and presentation of the transaction information, the processor is further operable to receive a user authorization input via the touch-screen user interface, of at least one user action selected from a set of user actions consisting of: a payment approval authorization, a payment denial, and an adjustment of a transaction payment.

According to another embodiment of the present invention, a payment system includes a payment card device and a personal computing device. The personal computing device includes a processor, a memory, a first wireless interface, a second wireless interface, a display coupled to the processor, operable to provide a user-interface operable for performing online transactions. The first wireless interface is operable to wirelessly obtain account information for the payment card device. The processor is operable to generate a limited-use payment information based on the account information for the payment card device including at least a portion of a payment card device issuer's payment information. The personal computing device is operable to generate a complete payment information for use in an online transaction, comprising the limited-use payment information. The personal computing device is further operable to convey the complete payment information via at least one interface selected from a set consisting of: the display, the first wireless interface, and a second wireless interface, and wherein the complete payment information is configured to be used in place of a payment card device's issuer payment information.

According to yet another embodiment of the present invention, a payment system includes a payment card device and a computing device operable for completing an online payment transaction. The computing device includes a display, a user-interface, a processor, and a memory for storing a payment card information accessible to the processor. Card issuer provided payment card information is wirelessly downloaded into the computing device, and the payment card device is configured to dynamically generate a limited-use payment information. Upon the authorization of a valid computing device user, the payment information provided by the computing device is used in an online transaction in place of the card issuer provided payment card information.

BRIEF DESCRIPTION OF THE DRAWINGS

Embodiments of the present disclosure are illustrated by way of example, and not by way of limitation, in the figures of the accompanying drawings and in which like reference numerals refer to similar elements.

FIG. 8B illustrates exemplary displayed characteristics of multifunction electronic device, in accordance with embodiments of the present invention.

DETAILED DESCRIPTION OF THE INVENTION

Figure 1:
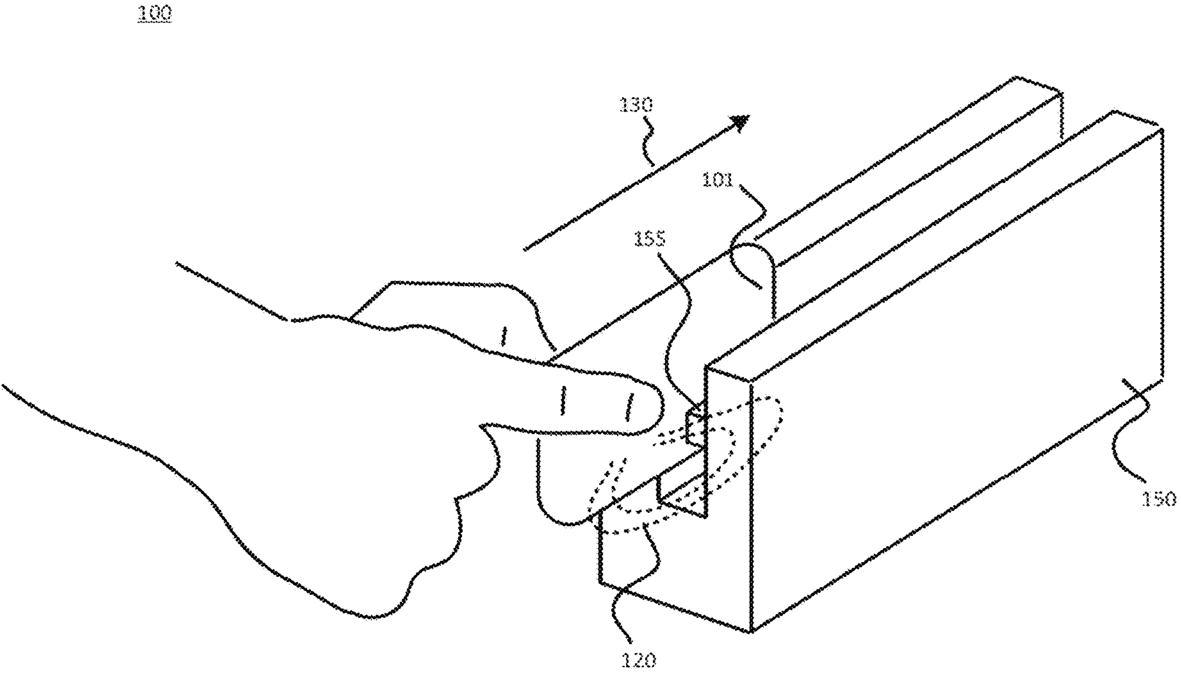
FIG. 1 is an illustration depicting an exemplary interaction between a multi-function electronic device and a standard magnetic card reader, according to an embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Encoding Via an Alternating Polarity of a Magnetic Field

In one embodiment of the present disclosure, a smart multi-function electronic device comprises a dynamic magnetic region (strip) incorporating a main inductor assembly from which programmed magnetic field data symbols are dynamically generated. In one embodiment the inductor assembly may be a planar coil formed within the material that embodies the multi-function electronic device. An advantage of using a planar coil is that it can dynamically produce a magnetic field in such a manner as to emulate the interaction between a traditional magnetic strip and a conventional credit card reader. As the magnetic strip of a conventional credit card is passed through a magnetic reader head, stripes of alternating magnetic polarity embedded in the strip induce a magnetic field of alternating polarity at the reader head. The pattern formed by the alternating polarity of the magnetic field encodes information, which when transformed by a transducer to a current signal in the magnetic reader head, provides user information for a transaction.

Embodiments of the present disclosure provide a multi-function electronic device able to generate a programmed magnetic field, wherein data is encoded and represented by an alternating polarity of the generated magnetic field. In a similar manner to a conventional plastic credit card, the magnetic field produced by the planar coil is able to be read by a pickup (or "transducer") and to thereby transmit information to the magnetic card reader. FIG. 1 illustrates a credit card transaction 100 performed between a multi-function electronic device 101 and a conventional magnetic reader 150. The multi-function electronic device 101 generates a magnetic field of alternating polarity 120 to be read by the conventional magnetic card reader 150, according to an embodiment of the present disclosure. The multi-function electronic device 101 is moved at a rate 130 relative to a magnetic reader head 155 of conventional magnetic card reader 150. The magnetic field 120 extends with sufficient distance and intensity from 101 so as to be read by magnetic head reader 155. The magnetic head reader 155 responds to the magnetic field 120 by producing a current in the conventional fashion, which is then interpreted as encoded information by the magnetic reader 150. Therefore the magnetic field of alternating polarity 120 produced by the multi-function electronic device 101 has a substantially identical encoding effect as a traditional magnetic strip.

A characteristic of encoding information in a conventional magnetic card strip is that binary information is encoded by the pattern of alternating magnetic polarity formed by ferromagnetic stripes embedded on the magnetic strip. As the conventional magnetic card strip has a standardized format, the encoding of information is provided at a specified data density (bits per inch), according to which conventional magnetic readers are designed for interpretation of encoded data. In order to most ably emulate a conventional credit card interaction with a conventional magnetic reader the multi-function electronic device 101 of the present disclosure is provided with a means of determining a substantially optimal rate for alternating the polarity of the generated magnetic field 120 in order to produce data at a rate which is able to be readily received and correctly interpreted by the conventional magnetic reader 150. Embodiments of the present disclosure provide several means of determining the relative movement rate 130 between the multi-function electronic device 101 and the magnetic reader head 155. These features, as well as other characteristics of the multi-function electronic device of the present disclosure, can be better appreciated by a description of the internal components and functions of multi-function electronic device 101.

Figures 2A, 2B:
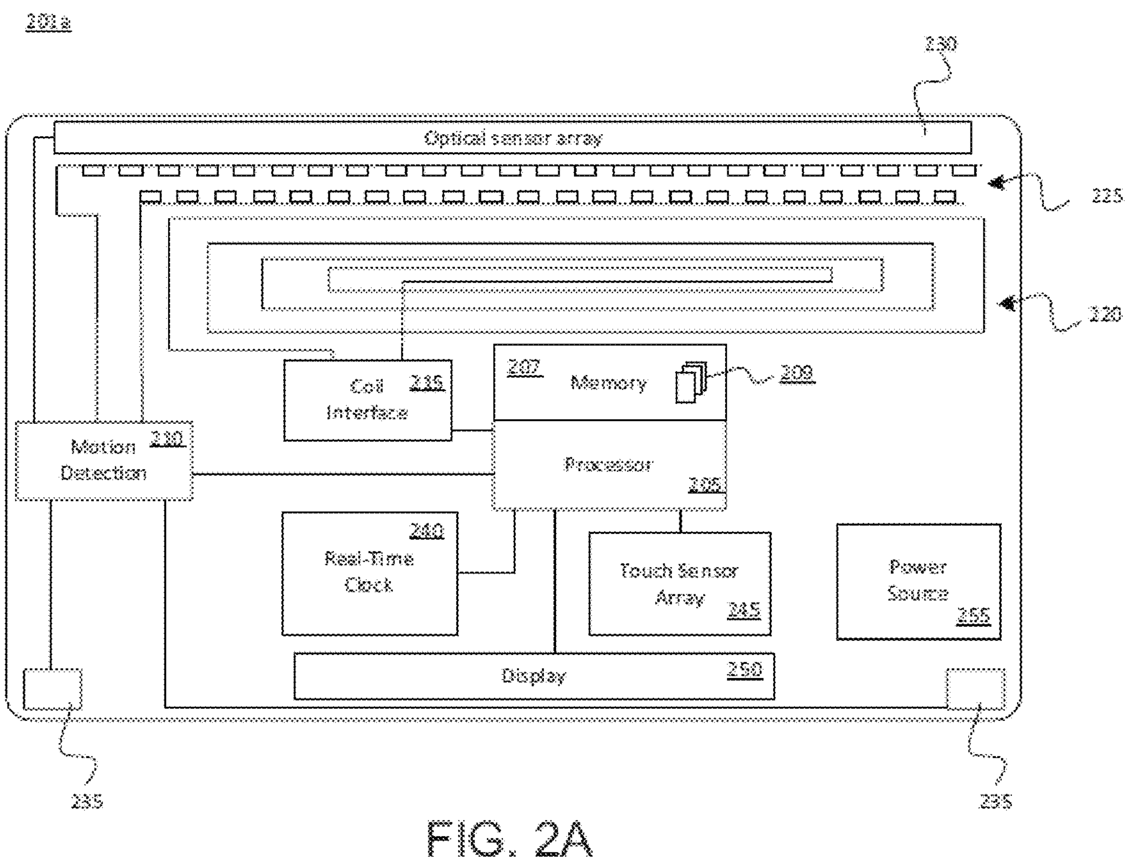
FIGS. 2A-2B are block diagrams illustrating data flow between the magnetic coils on the multi-function electronic device and the microprocessor on the multi-function electronic device according to an embodiment of the present disclosure.
Figure 8A:
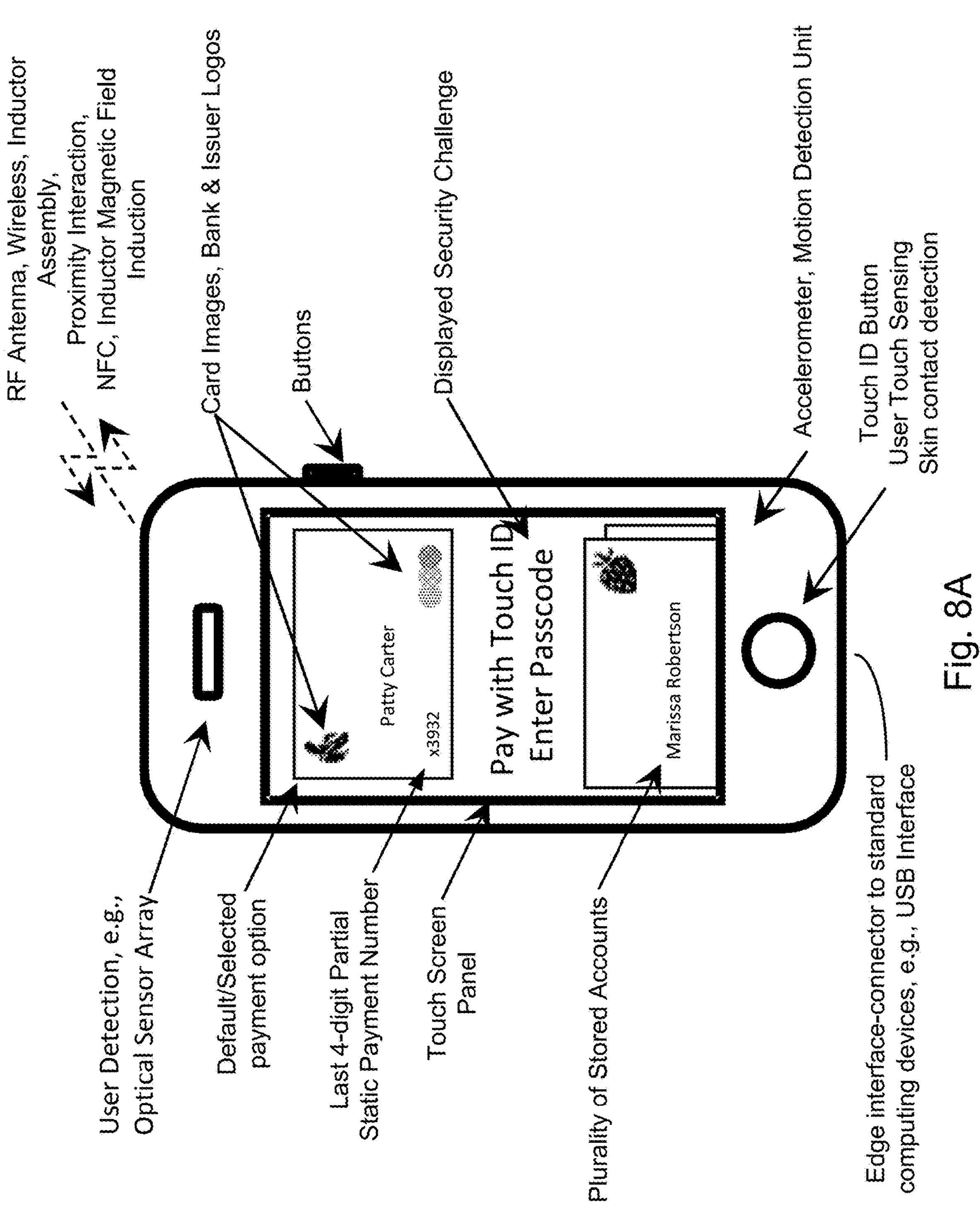
FIG. 8A illustrates an exemplary multifunction electronic device, in accordance with embodiments of the present invention.

FIGS. 2A and 2B depict exemplary embodiments of a smart multi-function electronic device, in a block diagram view. The components of the block diagram are illustrated according to functional connections, and their locations should not be construed as being limited to the respective locations as depicted in FIGS. 2A-2B. In FIG. 2A, multi-function electronic device 201*a* is shown in a block diagram view. Multi-function electronic device 201*a* comprises a processor 205 and a memory unit 207, the processor 205 operatively coupled to the components of multi-function electronic device 201*a*. The memory 207 comprises a plurality of accounts 209, which may be credit card accounts, banking accounts, merchant accounts, online accounts, cryptocurrency accounts, and combinations thereof. A motion detection module 210 is coupled to the processor unit 205 and to a set of motion detection units, which comprise a rate detection assembly 225, an optical sensor array 230, and a set of accelerometers 235. The magnetic field is generated via a planar coil 220, which is controlled by the processor unit 205 via a coil interface 215. The rate at which the magnetic field changes polarity to encode the user data depends on the rate of relative movement detected by the rate detector. The multi-function electronic device 201*a* further comprises a real-time clock 240, a touch-sensor array 245, and a display 250, each operatively coupled to the processor unit 205. A user input may be made via the touch sensor array 245, which may comprise a touch screen panel, a keypad, or a combination thereof. The display 250 is able to display an alphanumeric sequence, as well as graphical icons (such as a logo for a bank, or other images). See, for example, FIGS. 8A and 11. Further, an optional backup power source 255 is depicted.

In one embodiment, the processor unit 205 is connected to the planar coil 220 and the motion detection units, via the motion detection module 210. The processor unit 205 is responsible for determining the appropriate rate with which to output data from the planar coil 220, wherein output data is encoded using alternating polarity of a generated magnetic field. The rate of the alternating polarity of the magnetic field is generated in accordance with the detected movement speed with which the card is swiped through the reader, in order for the reader to receive the encoded data at the appropriate rate. Magnetic card readers, which are designed to read conventional credit cards, are constructed to read data at specified input rates that correspond with the data density present in conventional magnetic card strips. The magnetic data symbols generated by the planar coil 220 are produced to align with the rate at which data is being read by the magnetic card reader. Accordingly, it is irrelevant if the multi-function electronic device 201*a* of the present disclosure is being swiped quickly or slowly, the planar coil 220 is controlled by the processor unit 205 to produce data at a substantially optimized rate, where the rate of data production is dependent on the rate at which the multi-function electronic device 201*a* is detected to be passing across the magnetic reader head.

Figure 9:
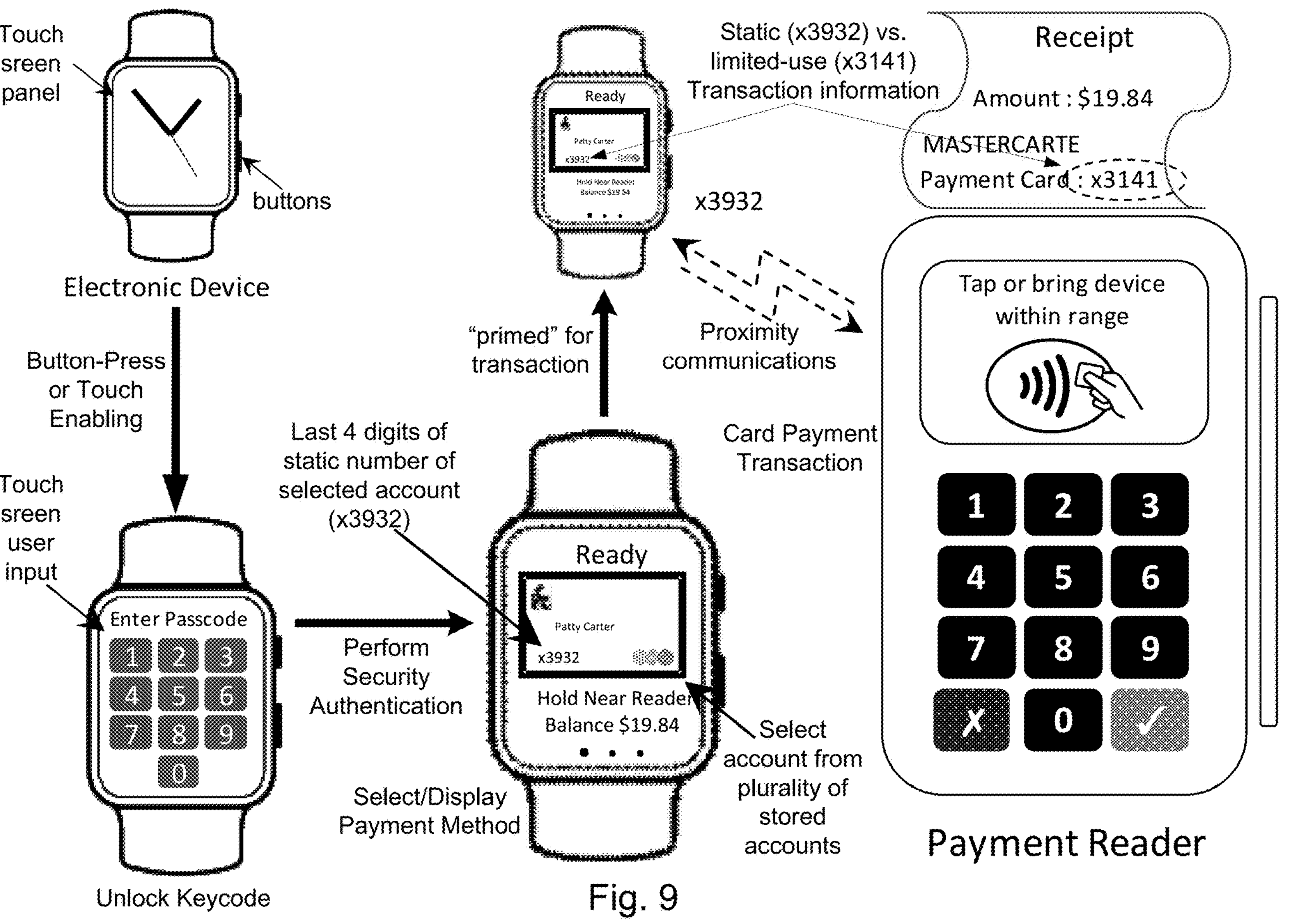
FIG. 9 illustrates an exemplary process of performing a financial transaction with a portable electronic device in conjunction with a payment reader, in accordance with embodiments of the present invention.

FIG. 2B depicts a multi-function electronic device 201*b* according to an embodiment of the present disclosure. Device 201*b* comprises a processor 205 and a memory unit 207, the processor 205 operatively coupled to the components of multi-function electronic device 201*b*. The memory 207 comprises a plurality of accounts 209, which may be credit card accounts, banking accounts, merchant accounts, online accounts, cryptocurrency accounts, and combinations thereof. A motion detection module 210 is coupled to the processor unit 205 and to a set of motion detection units, which comprise a rate detection assembly 225, an optical sensor array 230, and a set of accelerometers 235. Additionally, a galvanic sensor 275 is coupled to processor unit 205. The magnetic field is generated via a planar coil 220, which is controlled by the processor unit 205 via a coil interface 215. The rate at which the magnetic field changes polarity to encode the user data depends on the rate of relative movement detected by the rate detector. The multi-function electronic device 201*b* further comprises a real-time clock 240, a touch-sensor array 245, and a display 250, each operatively coupled to the processor unit 205. A user input may be made via the touch sensor array 245, which may comprise a touch screen panel, a keypad, or a combination thereof. See also, for example, FIGS. 8 and 9. The display 250 is able to display an alphanumeric sequence, as well as graphical icons (such as a logo for a bank, or other images). Further, an optional backup power source 255 is depicted. Multi-function electronic device 201*b* further comprises a near-field communication (NFC) unit 260, as well as a radio frequency identification (RFID) unit 265, both of which are operatively coupled to the processor unit 205. In one embodiment the NFC and RFID may share the planar coil for use as a RF antennae, through the coil interface 215. In one embodiment one or both the NFC and the RFID may have antennae dedicated to that individual sub-system. A universal serial bus (USB) connector 270 is coupled to the processor unit 205. The functionality of the components with regard to exemplary uses of multi-function electronic devices 201*a* and 201*b* is described in greater detail in the following description.

A further aspect of the present disclosure provides a single multi-function electronic device that can be used for multiple banks or financial institutions. For example, instead of carrying a separate credit card for each account of a variety of credit card companies, a customer need only to carry a single card according to embodiments of the present disclosure. The capability of the multi-function electronic device to generate a multitude of credit card numbers provides the ability of the multi-function electronic device to be associated with multiple accounts. Furthermore, inputs at the touch sensor array on the multi-function electronic device can be used to select the appropriate bank or credit provider account stored in the memory unit of the multi-function electronic device.

Figure 2C:
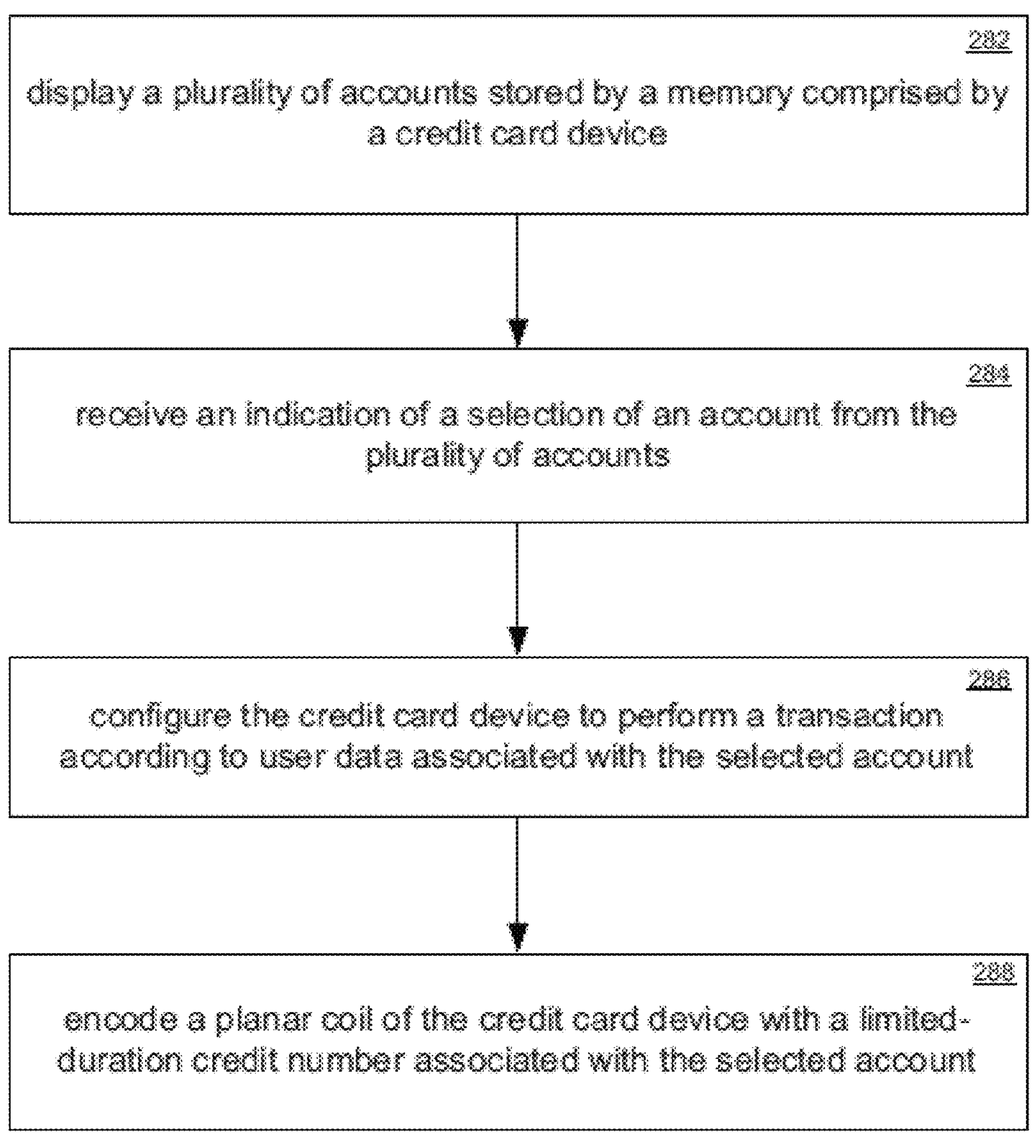
FIG. 2C depicts an exemplary process of selecting an account from a plurality of stored accounts according to an embodiment of the present disclosure.

FIG. 2C depicts a process of selecting an account from a plurality of stored accounts in order to perform a transaction with the selected account, according to an embodiment of the present disclosure. The process 280 begins at step 282, where a plurality of accounts stored by the multi-function electronic device memory is displayed. The plurality of accounts 209 are stored by memory 207, and are displayed using display 250. A user indicates an account selected from the plurality of accounts at step 284. The selection is able to be made by keypad or touch sensor array 245, and an indication of the selected account can be displayed via display 250. At step 286 the multi-function electronic device is configured according to account information associated with the selected account, which may include an account number, an expiration date, and other user information associated with the account (e.g. a username, PIN, password, email address, etc.). At step 288 the planar coil of the multi-function electronic device is encoded with a limited-duration credit card number that is associated with the selected account. The limited-duration credit card number is able to be generated according to the selected account, a timestamp, a transaction amount, an indicated merchant, user key or secrets, on-card unique hardware secrets, credit card authority key or secrets, user input from the card interface, and other information associated with the transaction.

Movement Rate Feedback

The relative movement rate of multi-function electronic device 201*a* is detected by one or more of the set of motion detection units, comprising the rate detection assembly 225, the optical sensor array 230, and the set of accelerometers 235. Each of the motion detection units detects the motion of the credit card 201*a* in a distinct manner. The rate detection assembly 225, which is positioned alongside (but independent of) the planar coil 220, is able to detect the location of a magnetic head reader as the rate detection assembly 220 is being passed through the credit card reader. The reader module of a conventional credit card reader comprises a metal head having a small gap at the tip of the head. A pickup armature resides in this gap, such that as the metal head passes over a credit card strip, an electric field is induced in the head reader pickup circuit. In one embodiment the rate detection assembly 225 is constructed of an array of auxiliary inductor coils and magnetic pickup coils. As the metal head of the card reader assembly passes over the arrangement of auxiliary inductor coils and magnetic pickup coils of the rate detection assembly 225, a disturbance in the magnetic field flowing between the two is induced, generating a change in current and producing a detected movement signal. The change in current is detected by the motion detection module 210, and is used to determine the rate of motion of the card reader head passing across the surface of the multi-function electronic device 201*a* (and therefore along the planar coil 220).

The optical sensor array 230 is also operable to detect a movement rate of the multi-function electronic device 201*a* with respect to a conventional magnetic card reader. The optical sensor array 230 is disposed nearby the planar coil 220, in order to accurately detect a movement rate in the region of the planar coil 220. In an embodiment, the optical sensor array 230 is a thin strip parallel to, and extending along, the length of the planar coil 220. The optical sensor array 230 determines a location of a minimum of received light, which corresponds to the region of a surface in nearest proximity to the optical sensor array 230. The magnetic reader head of a conventional magnetic card reader extends furthest from the surface of the card reader, and therefore the detected minimum in received light at the optical sensor array 230 corresponds with the location of the reader head. By tracking over time the position of this minimum received light along the optical sensor array, a detected movement rate may be found.

The set of accelerometers 235 are also operable to detect a movement rate of the multi-function electronic device 201*a*. The set of accelerometers 235 are positioned in the multi-function electronic device 201*a* in order to effectively measure the position and acceleration of the multi-function electronic device 201*a*. In an embodiment, the set of accelerometers comprises groups of accelerometers, each group having one or more accelerometers disposed at orthogonal planes to each other, and each group capable of generating signals that allow for determination of the orientation, motion and acceleration of the multi-function electronic device 201*a*.

The detected movement signal is received by the motion detection module 210. The detected movement signal is generated by any one of the set of motion detection units, or any combination of motion detection units of the set. For example, the movement detection signal is able to be generated by the combination of the rate detection assembly 225 and the optical sensor array 230. In an embodiment, the movement detection module 210 is able to determine the movement rate of the multi-function electronic device 201*a* from the detected movement signals, and transmits the determined movement rate, and orientation to the processor unit 205. In an embodiment, the motion detection module 210 sends the detected movement signal to the processor unit 205, and the processor unit 205 determines the relative movement rate.

In one embodiment, the generation of the magnetic field by the planar coil 220 at a specified rate of alternating polarity is accomplished according to the following description. One or more of the motion detection units in the set of motion detection units (rate detection assembly 225, optical sensor array 230, and set of accelerometers 235) detect a movement rate of the multi-function electronic device 201*a* with respect to a magnetic card reader, and signal the motion detection module 210. The movement rate is provided to the processor unit 205, which determines the appropriate rate for alternating the polarity of the magnetic field generated by the planar coil 220. The processor unit 205 outputs instructions or data to the coil interface 215 at the determined rate, which in an embodiment is a digital-to-analog converter (a DAC) and acts to translate the signal from digital to analog in order to drive the planar coil 220 and produce the magnetic field. The instructions from the processor unit 205 are comprise binary code, which are output through a shift register to the coil interface 215. The shift register outputs data at a rate proportional to the determined movement rate of the multi-function electronic device 201*a*—thus, a higher determined multi-function electronic device 201*a* movement rate has a corresponding higher output rate at the shift register, leading to a higher rate of alternating polarity at the generated magnetic field (i.e., encoded data symbols output more quickly). Conversely, a lower movement rate of multi-function electronic device 201*a* leads the processor unit 205 to control the shift register to output data at a lower rate, and consequently the rate of alternating polarity in the generated magnetic field is lower.

Figure 3:
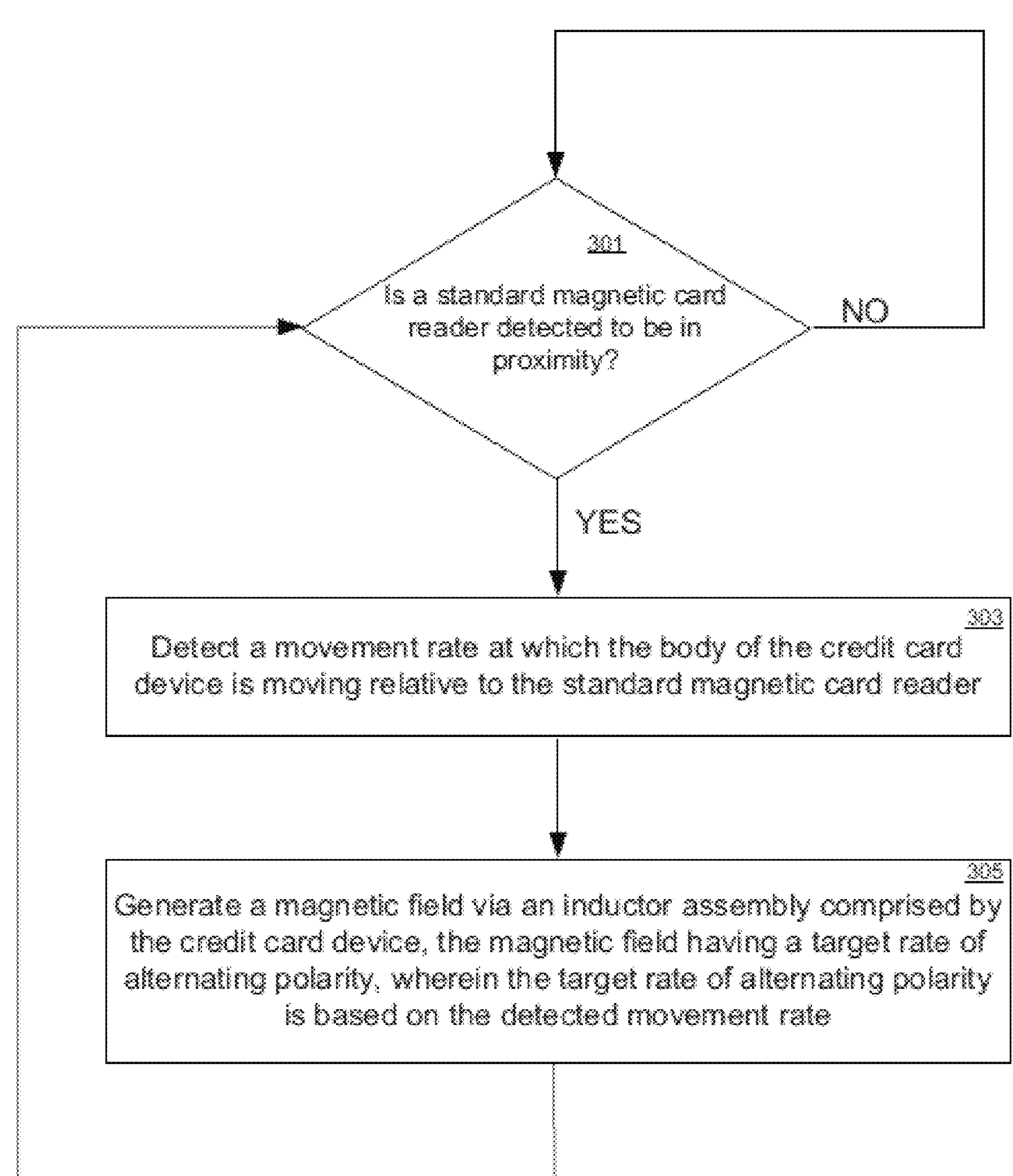
FIG. 3 is a flowchart illustrating an exemplary process of generating a magnetic field with an alternating polarity according to an embodiment of the present disclosure.

FIG. 3 illustrates an exemplary process 300 for determining the rate to alternate the polarity of the generated magnetic field of the multi-function electronic device, according to an embodiment of the present disclosure. At step 301 the process determines if a standard magnetic card reader is detected to be in proximity with the multi-function electronic device. If NO, the step repeats. If YES, the process moves to step 303. At step 303 a detection of a movement rate at which the body of the multi-function electronic device is moving relative to the standard magnetic card reader is made. The process continues at step 305, wherein a magnetic field is generated by an inductor assembly comprised by the multi-function electronic device, the magnetic field having a target rate of alternating polarity that is based on the detected movement rate from step 303. The process then repeats at step 301, determining if a standard magnetic card reader is (or remains) in proximity to the multi-function electronic device. In this manner, while a standard magnetic card reader is detected to be in proximity to the multi-function electronic device, the movement rate of the multi-function electronic device is determined and the polarity and orientation of the generated magnetic field is alternated at the appropriate rate, to recreate the data as described above, at the correct rate, in order to clock out the data to be conveyed to the magnetic strip reader, at a rate matching the action of an ordinary magnetic strip card through same the magnetic card reader.

Security

Security is an area of concern for credit card holders, as the small form factor makes theft quite easy, and additionally there are many ways for a malicious third-party to record the account number of a credit card in order to later make fraudulent transactions on the account. Embodiments of the present disclosure address security concerns of a credit card owner on several fronts.

Figure 4A:
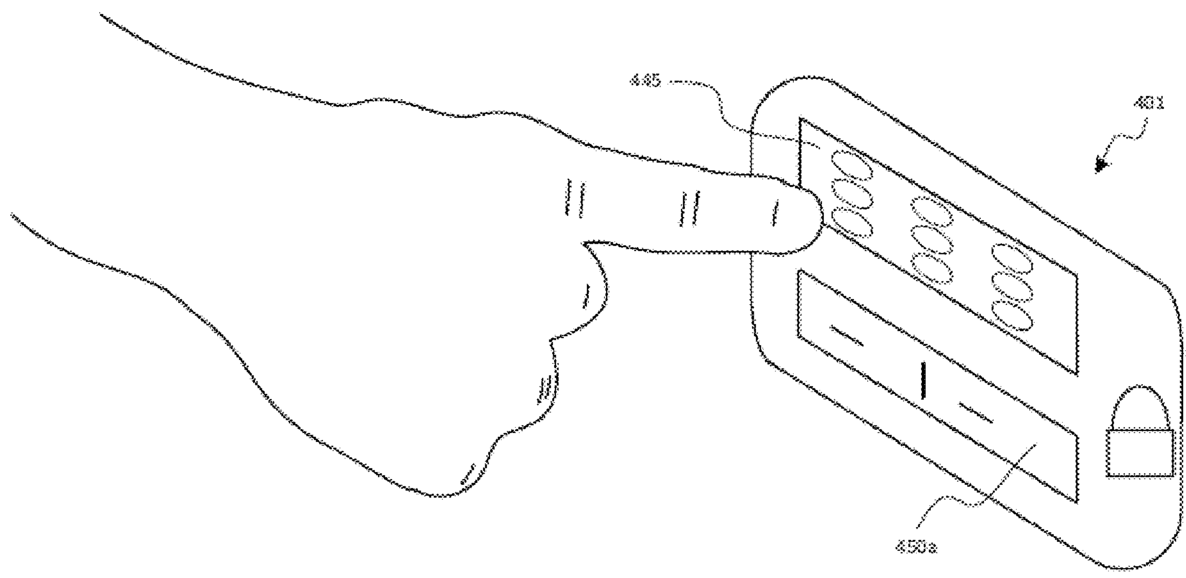
FIGS. 4A-4B illustrate a user interacting with a touch sensor of the multi-function electronic device, according to an embodiment of the present disclosure.
Figure 4B:
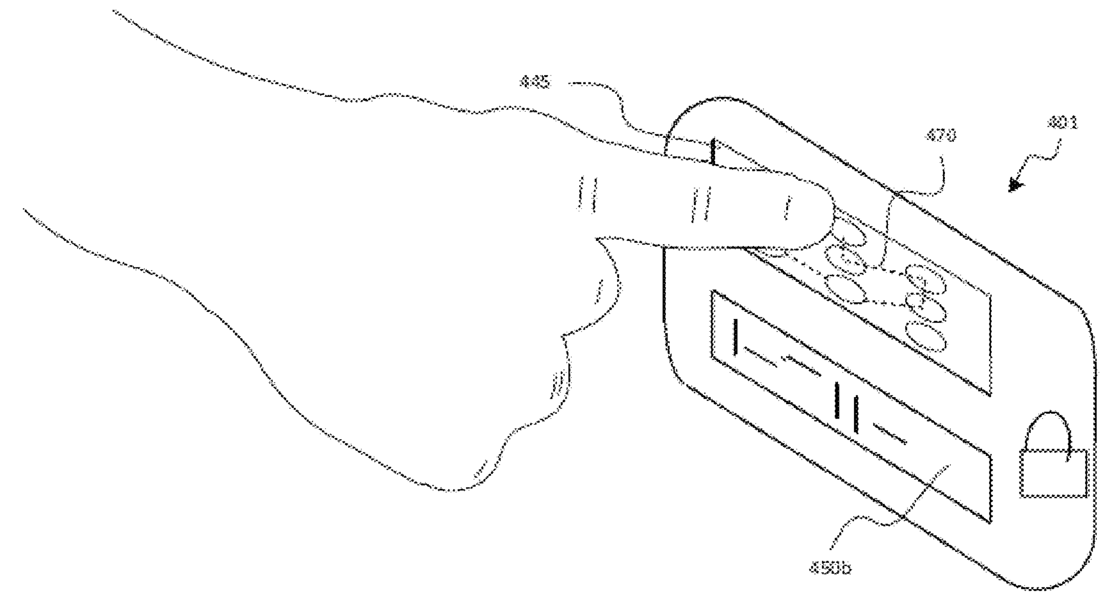

In one aspect, security of the multi-function electronic device is enhanced by providing a means of locking the multi-function electronic device in order to prevent use, until such time that a valid user input is entered. Embodiments of the present disclosure provide a multi-function electronic device having a region for receiving human input, e.g., touch sensors which are able to be formed by contacts that a user can press (e.g., the touch sensor array 245 of FIGS. 2A-2B). FIGS. 4A-4B illustrate a user interacting with a multi-function electronic device 401 via a keypad or touch sensor array 445. In FIG. 4A, the multi-function electronic device 401 is in a locked state. A display 450 is able to display a message to the user, for instance, the message “device locked” or “enter password,” or question prompts which guide the user to respond with answers through the key-pad or the touch sensor, to certain preset questions, that confirm personal knowledge known only to the associated user. The touch sensor array 445 enables user interaction with the multi-function electronic device 401. An exemplary use of the touch sensor array 445 is an input of a currency amount to be used in a transaction. The touch sensor array 445 is able to include buttons, or a touch-sensitive pad, or a combination of the two. Other embodiments of the touch sensor array 445 allowing a user to input data to the multi-function electronic device 401 are consistent with the spirit and scope of the present disclosure.

In order to unlock the multi-function electronic device 401 and enable a transaction or other usage, the user inputs data via the touch sensor array 445. FIG. 4B illustrates the user inputting a password via a gesture 470, which operates to unlock the multi-function electronic device 401. The display 450*b* is able to display a message indicating the multi-function electronic device 401 is unlocked and ready for use, for instance, display 450*b* may display the message "unlocked," or it may display an account number associated with the multi-function electronic device 401.

Embodiments of the present disclosure provide additional functionality for the touch sensor array 445. For example, there may be touch contact terminals that a user can press to wake up the multi-function electronic device 401, to cause the battery to supply power, or to place the multi-function electronic device 401 in a power reduction mode when it is not being used. In an embodiment, if any number other than the correct password is entered multiple times, or if there is an attempted usage of the multi-function electronic device 401 without entering in a password, an automatic phone call may be triggered to the appropriate fraud protection authorities.

In one embodiment of the present disclosure, the display 450 is a thin-film liquid crystal display ("LCD"). The display 450 is able to have multiple uses. In one embodiment, the display 450 can be used to cue the user for a security question upon input of an improper password. Or if fraud protection services need to contact a customer, they can verify the customer's identity by transmitting a security question to the display 450 of user's multi-function electronic device 401, to which the user would need to respond correctly using the input buttons of touch sensor 445 on the card. See also, for example, FIGS. 8 and 9.

Limited-Duration Credit Card Number

A further security feature of the multi-function electronic device provided in the present disclosure is the capability of producing a limited-duration credit card number for performing transactions using accounts of the card. The multi-function electronic device comprises a real-time clock that is able to produce a cryptographically protected timestamp for each interaction. The power source is able to activate the processor unit such that a unique number may be generated by the multi-function electronic device and verified by the credit authority according to the timestamp and the transmitted user information. The limited-duration credit card number is able to be produced at the time the multi-function electronic device is performing a transaction, and is able to be generated according to the user's private information, a bank information, information regarding the facility performing the transaction, and the time of day. The limited-duration credit card number is able to be limited to only one transaction, a finite number of transactions, or may be limited to a specified period of time—e.g., 2 minutes, 10 minutes, 3 hours—after which time that particular limited-duration number would become invalid. As detailed above, if an expired limited-duration credit card is attempted to be used for a transaction, the transaction is denied and an automatic notification is able to be made to a credit authority in order to notify the user and to prevent transactions on the account. The transaction count is able to be determined through the action of passing the card through magnetic reader, and the process of transmitting the card number to the card reader.

In one embodiment, the number on the front of the card is able to be a full or partial number. In an embodiment, the number displayed on the multi-function electronic device is a static number, but the number transmitted during a transaction is a limited-duration credit card number as described above. The number displayed on the multi-function electronic device may not necessarily be a static number. For example, the first four and last four digits of the credit card number are able to be fixed, while the remaining eight digits can be dynamically generated. As the credit card is read by the machine, part or all of the number may be dynamically produced at the time the card is read. As described above, the dynamic part of the limited-duration credit card number generated may be based on the user's private information, the user's bank information, the time of day, or the facility that is reading the card. Further, the expiration date of the multi-function electronic device can also be dynamically generated. See also, for example, FIGS. 8, 9 and 11.

Figure 11:
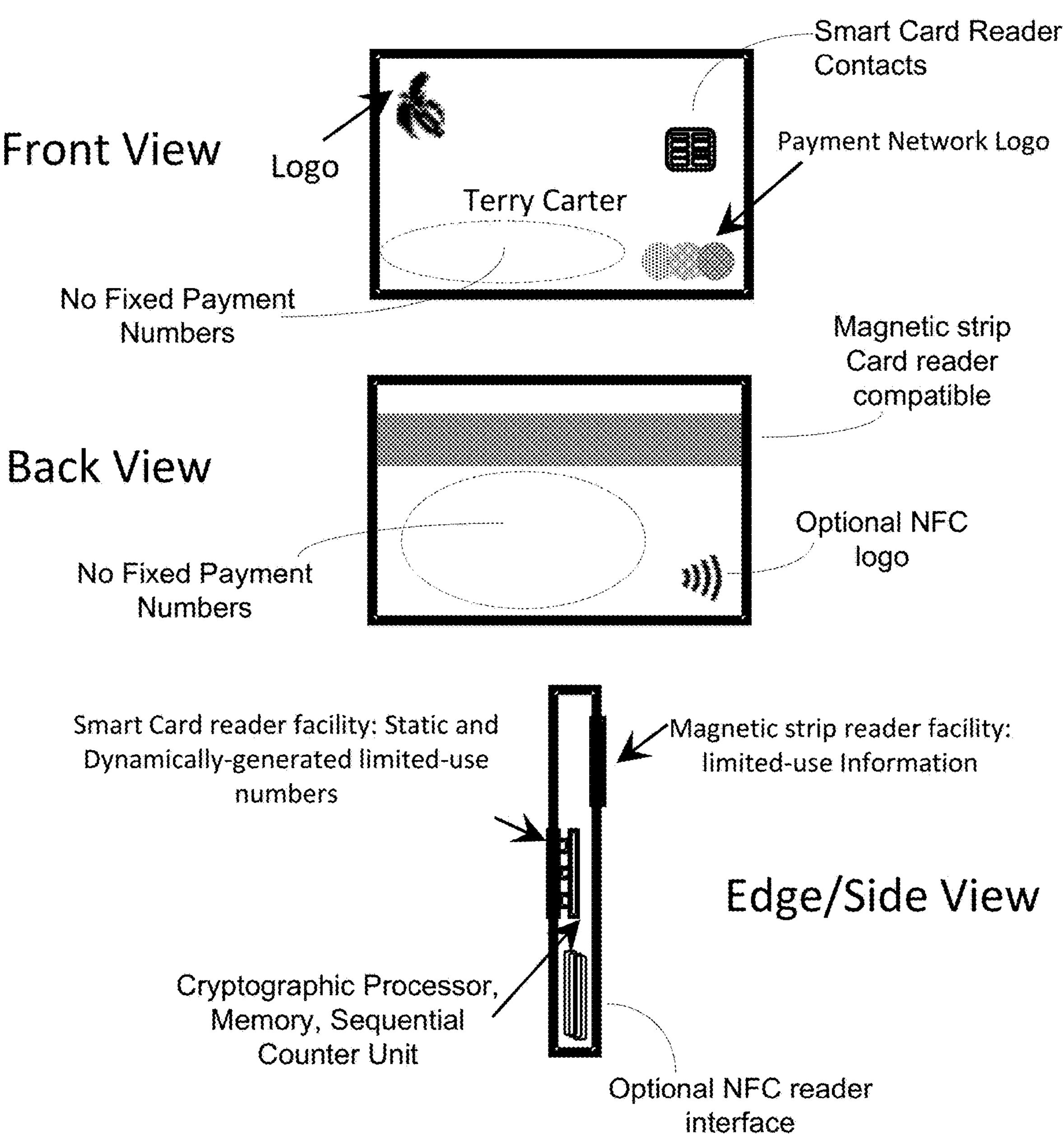
FIG. 11 illustrate an exemplary electronic credit-card-like multi-function electronic device that has no fixed payment information, in accordance with embodiments of the present invention.
Figure 12:
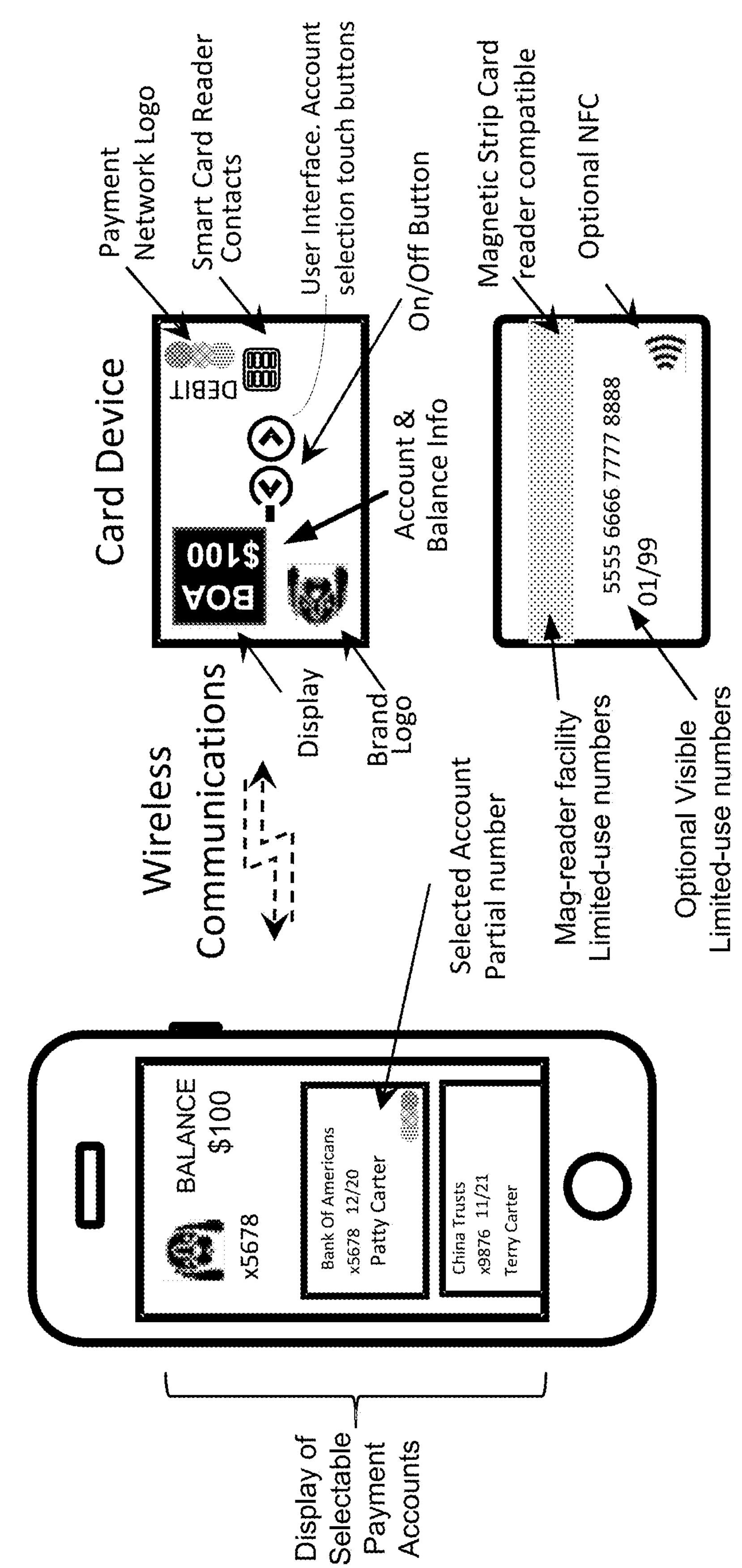
FIG. 12 illustrates an exemplary process for user selection of a preferred payment account for an electronic credit card-like device, in accordance with embodiments of the present invention.

Effectively, embodiments of the present disclosure provide a multi-function electronic device that has no fixed number, as illustrated in FIG. 11, and therefore the account cannot be compromised. Only the number generated at the instant of the credit card transaction matters. Accordingly, unauthorized use of the multi-function electronic device is highly unlikely, because a transaction cannot be conducted with an expired limited-duration credit card number, or only the static portion of the credit card number. In one embodiment of the present disclosure, sufficient dynamically generated numbers are provided for on the credit card such that a unique credit card number can be generated for each transaction. In this embodiment, the credit card of the present disclosure effectively acts as a unique per-transaction credit card.

With reference to FIG. 2A, 2B, in one embodiment, the process steps enabling a card transaction are as follows. A multi-function electronic device (e.g., multi-function electronic device 201*b*) is connected to a computer system (e.g. computer system 590, FIG. 5), via any of the connection means available to the multi-function electronic device (USB 270, NFC 260, and RFID 265). User data and other essential information, such as account information, are downloaded to the multi-function electronic device. For example, for an account designed for online transactions, user account information will likely include an account email and an account password. The account may be for example a bank account, a credit account, a merchant account, an online transaction account, or a cryptocurrency. In one embodiment a currency amount is also downloaded, which is made accessible to the multi-function electronic device 201*b* for transactions. In an alternative embodiment, rather than a currency amount being downloaded to the multi-function electronic device 201*b*, the user account information (e.g., username and password) is stored such that a subsequent authorized multi-function electronic device 201*b* transaction is automatically pre-authorized to deduct (or credit) the entered transaction amount at a stored account. In an embodiment, a user uses the touch sensor array 245 of the multi-function electronic device 201*b* in order to input the user information, including the amount of currency to be stored. The information entered by the user is able to include an account source of a transaction (e.g., bank account, credit account, merchant account, ATM, online payment service, or a cryptocurrency), as well as a type of transaction to be made (e.g., as a debit card, as a credit card, or as a user account). In another embodiment, the information is entered using the computing system to which the multi-function electronic device 201*b* is connected.

Transactions may be authenticated on the specified account by entry of the username and password for the account during the transaction, using the touch sensor array 245. In an embodiment, a password for an account is represented by a user input (such as a gesture, a swipe, and/or an unlock keycode) which is entered on multi-function electronic device 201*b* during a transaction for account authentication. See also, for example, FIG. 9. According to an embodiment of the present disclosure, a user that has "primed" the multi-function electronic device 201*b* for a transaction has already performed a security authentication on the card, and therefore a subsequent card transaction is able to be pre-authorized to perform the transaction without further user authentication steps. The priming action can be a tap of the multi-function electronic device 201*b* detected by accelerometers 235, or a gesture, swipe, or a key input received by touch sensor array 245. See also, for example, FIG. 9.

A transaction is able to be communicated using the planar coil 220. In one embodiment, when the transaction is a credit card transaction, a limited-duration credit card number is generated. A user inputs an amount for the transaction using the touch sensor array 245, and the limited-duration credit card number is generated to correspond with the entered amount. The binary data corresponding to this limited-duration credit card number is sent from the processor unit 205 to the coil interface 215, where it is converted to an analog signal in order to drive the planar coil 220 to generate a magnetic field having an alternating polarity corresponding to the encoded data of the limited-duration credit card number.

Online Transactions

Figure 5:
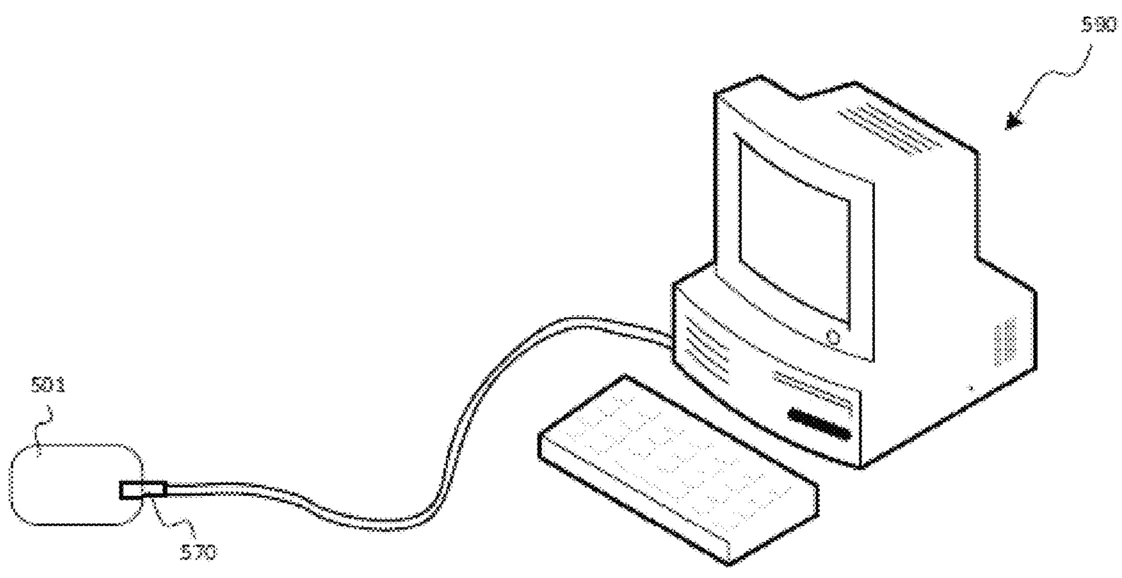
FIG. 5 is an illustration of a multi-function electronic device connected with a computing system and operating according to an embodiment of the present disclosure.
Figure 10:
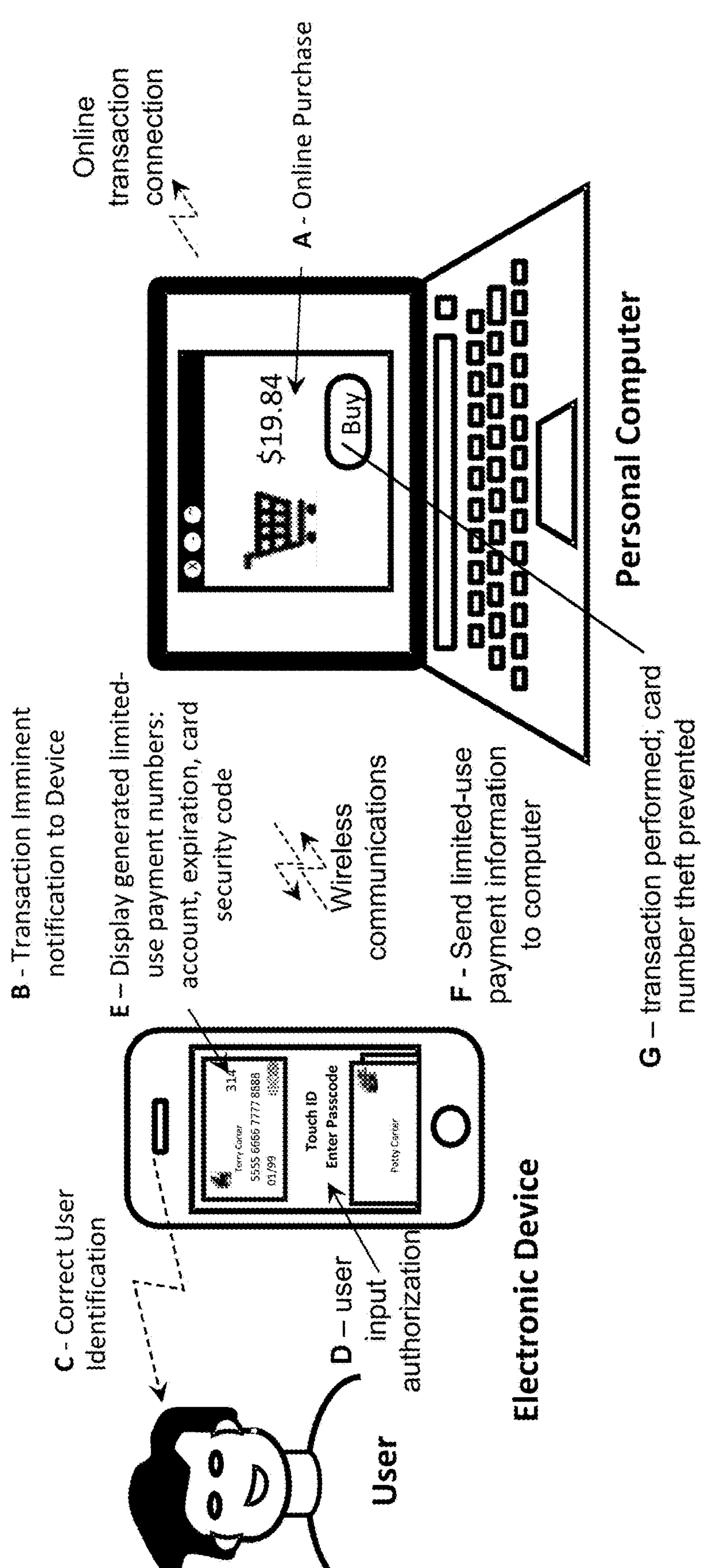
FIG. 10 illustrates an exemplary process for performing a financial transaction with a portable electronic device in conjunction with a personal computer, in accordance with embodiments of the present invention.

FIG. 5 displays the multi-function electronic device 501 in connection with a computing device 590. In one embodiment, the multi-function electronic device 501 is able to be used to make online purchases. In one embodiment, the multi-function electronic device 501 is equipped with a means 570 for communicating with the USB port on a computer or other device in order to make online purchases. In one embodiment the multi-function electronic device 501 may have an area cut-out, such that contact terminals corresponding to a USB cable connector are contained within, enabling connection of a USB cable (e.g., a micro-USB connection). When performing online transactions, the multi-function electronic device 501 can uniquely generate a limited-duration credit card number (as described above) for online purchases. The multi-function electronic device 501 receives a user input indicating that a transaction is imminent, and an authorization. The user input is able to comprise a gesture, a swipe, a key input sequence, and combinations thereof. The limited-duration credit card number is able to be displayed on the front display of the multi-function electronic device 501. In one embodiment, the multi-function electronic device 501 is able to use RFID 265 or near field communication NFC 260 technology in order to connect to a personal computer 590. This enables a per-transaction, limited-use credit card number, enhancing the security of the credit account by substantially negating the possibility of a theft of the credit card number used to perform the transaction leading to account compromise. See also, for example, FIG. 10.

According to an embodiment, the transaction is able to include information regarding a user account, such as an email address of the user, and upon reconnection of multi-function electronic device 201*b* to a computer system (for instance, computer system 590), the transaction information stored on multi-function electronic device 201*b* could be "replayed" by the computer system in order to finalize the transaction.

In one embodiment, a means of limiting an available credit amount are provided. According to the download process described above, the multi-function electronic device is able to have a total credit available. The multi-function electronic device is able to reference the total credit available in subsequent transactions, and will provide limited-duration credit card numbers corresponding to amounts up to, but not exceeding, the remaining credit available to the multi-function electronic device. An attempt to perform a transaction having an amount exceeding the remaining credit available will not result in a valid limited-duration credit card number, and therefore an authenticated transaction cannot proceed. In general, the multi-function electronic device will only successfully generate a limited-duration credit card number if the proper conditions for a transaction are determined to be present. The proper conditions for a transaction comprise a correct identification having been made by the user (via a gesture, swipe, and/or key input) and an amount for the transaction indicated to be less than the total credit available to the account indicated for the transaction.

Card-to-Device Transactions

In addition to transactions performed using conventional magnetic card readers (such as at point-of-sale locations, banks, and automated teller machines (ATMs)) and via cable connection with a computing device, transactions performed wirelessly between a card and a device (e.g., card-to-card, card-to-computer device having a reader dongle, card-to-ATM) are provided according to embodiments of the present disclosure. See, for example, FIGS. 8 and 10. For simplicity, the following describes a card-to-card transaction, but it will be understood that card-to-device transactions are similarly provided.

Figure 6:
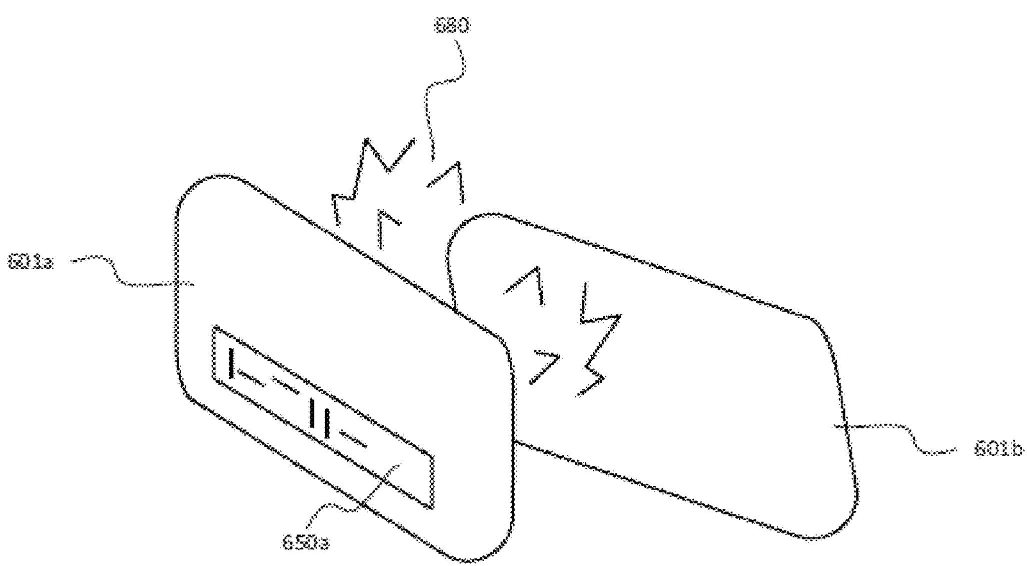
FIG. 6 is an illustration of two multi-function electronic devices performing a transaction according to an embodiment of the present disclosure.

FIG. 6 illustrates a card-to-card transaction according to one embodiment. A first multi-function electronic device 601*a* comprises a display 650*a,* and is in contact with a second multi-function electronic device 601*b*. A contact interaction between the cards is indicated by interaction 680. In one embodiment, the contact interaction is a tapping of multi-function electronic device 601*a* against multi-function electronic device 601*b*. In another embodiment, an optical sensor array at one or both of the cards detects interaction 680. In another embodiment, interaction 680 indicates a swipe of multi-function electronic device 601*a* across multi-function electronic device 601*b*. In one embodiment a user input through the key-pad initiates and enables a transaction from first card to second card. In one embodiment the presence of second card in preparation for card to card transaction is confirmed through "polling," the process of which involves transmission of data between cards, and confirmed receipt of transmitted data by response received from second card received at first card, including information confirming receipt of the information, by second card.

The planar coil comprised by each of multi-function electronic device 601*a* and multi-function electronic device 601*b* is able to be a means of transferring information for a transaction, e.g., such as an antenna. Once either, or both, of multi-function electronic device 601*a* and multi-function electronic device 601*b* detect interaction 680, a transaction is able to be completed via generation of a magnetic field at one card and reception of the magnetic field (i.e., reading) at the other card. In this manner, the card (e.g., multi-function electronic device 601*a*) receiving the transaction information operates its planar coil in an antenna mode. This enables multi-function electronic device 601*a* and multi-function electronic device 601*b* to authentically perform a transaction, and to transfer a currency between multi-function electronic device 601*a* and multi-function electronic device 601*b*. As described above, in an embodiment the transaction is able to use a limited-duration card number to encode the transaction.

In an embodiment, a set of accelerometers is used to detect the beginning of the transaction, for instance, a transaction performed by a swipe of multi-function electronic device 601*a* across multi-function electronic device 601*b*. Further, the set of accelerometers can detect a "priming" action for a multi-function electronic device, i.e., an indication for a multi-function electronic device that a transaction is imminent. The priming action can be a tap of the multi-function electronic device 601*a*, or tapping the multi-function electronic device 601*a* against the multi-function electronic device 601*b*. In one embodiment, a touch sensor array is able to be used for the priming action.

In an embodiment of a card-to-card transaction, one card (e.g. 601*a*, the card of the user having a currency debit) generates the limited-duration credit card number, which is transmitted via the card's planar coil. The multi-function electronic device of the recipient (e.g., 601*b*, the card of the user receiving a currency credit) receives the encoded data via the planar coil, acting as an antenna, and the coil interface is able to convert the received signal into a digital signal understood by the processor to be the limited-duration credit card number, identifying both the correct account and the amount of the transaction.

In one embodiment, the multi-function electronic device 201*b* stores cryptocurrency information in processor unit 205. The cryptocurrency information stored is able to include a plurality of cryptocurrency addresses, a plurality of private keys, and a plurality of public keys. The multi-function electronic device 201*b* is able to perform a transaction, as described above, using a cryptocurrency as the specified account. In one embodiment, the multi-function electronic device 201*b* is able to hash a portion of the transaction, using the processor unit 205 and the real-time clock 240 along with user information pertinent to the cryptocurrency account and the transaction. A subsequent connection of the credit card 201*b* to a computing device provides a means of connecting to the cryptocurrency servers and finalizing the transaction. Further, the multi-function electronic device 201*b* is able to sign a cryptocurrency transaction by, for instance, receiving a prompt at the display 250 to input a dynamic PIN specific to the transaction, which is able to be entered by touch sensor array 245.

In a card-to-card cryptocurrency exchange, a record of the transaction can be made according to the following. A first card (e.g. 601*a*) making a deduction with an amount indicated via touch sensor array 245 is able to generate a record of the transaction and store the record in the card memory, while a second card (e.g. 601*b*) receiving the cryptocurrency is able to generate a confirmation of the received transaction amount. In one embodiment, the amount indicated is provided by the receiving card 601*b*. The hashed record of the transaction contains the unique information of each user, along with the transaction amount. The success or failure of the transaction is able to be displayed on the respective displays of credit cards 601*a* and 601*b*.

Account Theft and Unintended Use Prevention

A security concern for conventional credit cards utilizing wireless communication means is the ability of a thief to access and/or copy user information through un-detected interaction with the wireless communication means. Sensitive and confidential information can be gleaned via, for example, "listening-in" on an RFID interaction between a credit card and a contactless reader, recording the characteristics of the interaction, and replicating certain characteristics to fake an authorized transaction. While to a great extent security concerns are addressed by the usage of limited-duration credit card numbers and other security features provided for by the credit card of the present disclosure and previously described, a further security feature regarding the wireless communication means of the multi-function electronic device is described herein.

In one embodiment, wireless communication means of the multi-function electronic device 201*b* are in a powered-down, or disabled, state prior to receiving an authenticated activation signal from a user. Upon receiving the activation signal, the communication means (e.g., NFC 260, RFID 265, and planar coil 220) are activated, enabling the multi-function electronic device 201*b* to conduct a transaction. The activation signal can originate from one (or a combination) of the set of motion detection units (rate detection 225, optical sensor array 230, and accelerometers 235), the touch sensor array 245, and the galvanic sensor 275. The galvanic sensor 275 is operable to detect a contact of human skin, via a current produced at the sensor 275 upon such contact. See also, for example, FIG. 8. In an embodiment the galvanic sensor 275 is comprised of metallic contacts disposed on opposite sides of, and isolated by, the body of multi-function electronic device 201*b*. In one embodiment, the current produced by user contact with the galvanic sensor 275 contacts is sufficient to provide small amounts of energy in order to power components of the card. For example, energy produced is able to power the processor unit 205 and the RFID 265. In one embodiment the galvanic sensor 275 further comprises two conducting surfaces separated by a junction, and the galvanic sensor 275 is configured as a thermoelectric generator (e.g., via the Peltier effect, the Seebeck effect, or a combination). For example, heat applied at one surface of the multi-function electronic device 201*b* may lead to differential heating between the opposing, separated conducting surfaces of the galvanic sensor 275, generating an electric current and powering a subset of, or all of, the components of multi-function electronic device 201*b* (e.g., the processor unit 205, the NFC 260, and the RFID 265).

In an embodiment, the communication means are activated only so long as the activation signal continues to be detected. In another embodiment, the communication means are activated for a specified amount of time following detection of the activation signal. For example, if using the multi-function electronic device 201*b* in an ATM (or other device) preventing continuous human contact, the activation signal is able to be a swipe, gesture, or key input sequence entered via the touch sensor array 245, which activates the card for a specified duration (for instance, one minute). In an embodiment the detection of motion through accelerometer input indicates activation by a valid user. In one embodiment the specific motion detected through accelerometer input corresponding with a specific user action, such as a “flick”, “swipe”, “spin”, “wave”, “tap,” may be used to initiate activation, wherein the motion is not normally generated at idle and during periods of inactivity. For example the motion not being generated accidentally while the card is stored in a user’s wallet, carried while the user is actively moving, or is being handed from user to a clerk at a point of transaction. In one embodiment the specific motion, or sequence of motions, may be associated with a user, and stored on the card memory, such that performing the correct sequence when prompted can confirm the possession of the card by the known owner, thus initiating activation and enabling usage.

Figure 7:
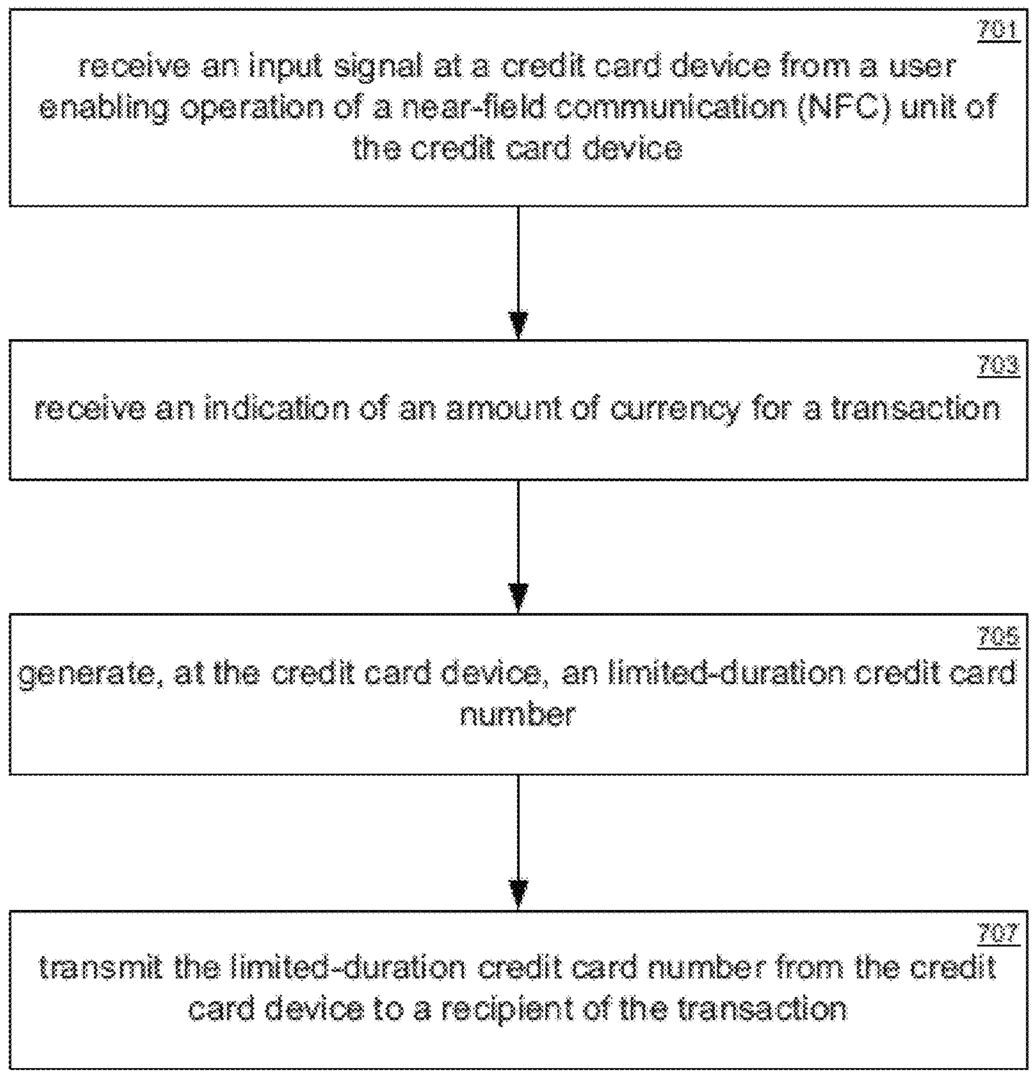
FIG. 7 depicts an exemplary process according to an embodiment of the present disclosure.

FIG. 7 depicts a process of selectively enabling the communication capability of the multi-function electronic device according to an embodiment of the present disclosure. The process 700 begins at step 701, where an input signal is received at the multi-function electronic device from a user. The input signal is able to be generated by any one, or combination, of a plurality of input means, where the input means comprise: a swipe gesture received at a touch sensor array; a key press sequence; an accelerometer sensor indication of multi-function electronic device motion; and a galvanic sensor indication that the credit card is in a user grasp. The input received from the user enables operation of a near-field communication (NFC) unit of the multi-function electronic device. In one embodiment, the NFC unit is disabled prior to receiving the input signal. In one embodiment, an RFID communication unit is disabled prior to receiving the input signal, and is activated by the input signal. In one embodiment, the planar coil is disabled prior to receiving the input signal, and is activated by the input signal.

The multi-function electronic device, following enablement of the NFC unit, receives an indication of an amount of currency for a transaction at step 703. At step 705, the multi-function electronic device generates a limited-duration credit card number, which at step 707 is transmitted to a recipient of the transaction. In one embodiment, the limited-duration credit card number has a limited recurrence, and is limited in scope of use to a predetermined number of authorized transactions.

In the foregoing description of process 700, the ordering of the process steps is exemplary and should not be construed as limiting. Alternative ordering of the process steps is consistent with the present disclosure, as conceived by one skilled in the relevant art.

In one embodiment of the present invention, a credit card comprises a dynamic magnetic strip incorporating a main inductor assembly from which magnetic field data symbols are dynamically generated. In one embodiment the inductor assembly may be a planar coil formed within the plastic that the credit card is composed with. The advantage of using a planar coil is that it can produce the same magnetic field interaction that a traditional magnetic strip on a conventional credit card can produce when it is passed through a reader. Similar to a traditional plastic credit card, the planar coil can also produce a magnetic field that can be read by a pickup (or “transducer”). The pickup produces electric current in the coil that, in turn, produces a magnetic field that is read by the pickup. Accordingly, the planar coil can be read in the same way as the magnetic strip on a traditional plastic credit card. The magnetic field produced by the planar coil would behave identically to a traditional magnetic strip.

In one embodiment, alongside the main planar coil, auxiliary rate detection assembly independent of the main inductor assembly would be provided to assist with the alignment of the production of data from the loop as it is being passed over the head of the credit card reader. The reader module of a traditional credit card reader comprises a metal head with a small gap on the tip of the head. This gap is where the pickup armature resides, so that when the metal head passes over the credit card strip, an electric field is induced in the head reader pickup circuit. In one embodiment the auxiliary rate detection assembly is constructed of an array of auxiliary inductor coils and magnetic pickup coils, alongside the main coil. As the metal head of the card reader assembly passes over the arrangement of auxiliary coils and pickup circuits, a disturbance in the magnetic field flowing between the two generates a electrical current change that is detected by a rate detection circuit so as to detect the rate of motion of the card reader head passing across the surface of the card and therefore along the main induction assembly. The purpose of this is to allow the determination of the rate or production of magnetic data symbols in the main inductor assembly to align with the rate at which data is being read by the reader, according to the data density of standard card magnetic strips. Accordingly, it is irrelevant if the credit card of the present invention is being swiped fast or slow, the main inductor assembly produces data at just the right rate depending on the rate at which the card is detected it is being passed over the reader’s head.

In one embodiment, a microprocessor is connected to the main coil and the alignment pickups. The microprocessor is responsible for producing the data from the coil at the appropriate rate in accordance with the speed with which the card is swiped through the reader. As shown in FIG. 1, the auxiliary coil detects the rate at which the credit card is being swiped. The microprocessor then uses this information to produce the data from the main planar coil at the appropriate rate for the credit card reader.

In addition, the credit card of the present invention comprises a real time clock that can produce a cryptographically worthy timestamp for each interaction and a battery back up that can be used to power up the microprocessor. Further, the card can comprise additional human inputs, e.g., touch sensors which can be formed by contacts that a user can press. For example, there can be contacts that a user can press to wake up the card, to cause the battery to supply power, or to put the card to sleep when it is not being used. There can also be additional inputs to key in customer specific information. For example, there can be inputs to key in a password or any other kind of unique identifier. If any other number besides the password is entered multiple times, or if there is attempted usage of the card without entering in a password, an automatic phone call may be triggered to the appropriate fraud protection authorities.

In one embodiment, the number on the front of the card can be a full or partial number. The number may not have to necessarily be a static number. For example, the first four and last four digits of the card number can be fixed while the remaining eight can be dynamically generated. As the credit card is read by the machine, part or all of the number may be dynamically produced at the time the card is read. The dynamic part of the number generated may be based on the user’s private information, the user’s bank information, the time of day or the facility that is reading the card. Further, the expiration date of the card can also be dynamically generated. Effectively, a credit card can be created that has no fixed number and therefore cannot be stolen. Only the number generated at the instant the card is being used matters. Accordingly, unauthorized use of the card is nearly impossible because no transaction can be conducted with only the partial static part of the credit card number. In one embodiment of the present invention, enough dynamically generated numbers are provided for on the credit card such that a unique credit card number can be generated for each transaction. In this embodiment, the credit card of the present invention effectively acts as a unique per transaction credit card.

In embodiments of the present invention comprising dynamically created credit card numbers, a single credit card can be used for multiple banks. For example, instead of carrying a separate credit card for all the different credit card companies, a customer would only need to carry a single card and one of the inputs on the front of the card can be used to select the appropriate bank or credit provider.

In one embodiment of the present invention, a thin film liquid crystal display ("LCD") can be fitted on the card so the credit card can have a display screen. The display can have multiple uses. In one embodiment, the display can be used to ask the user a security question if an improper password is entered. Or if the fraud protection services need to contact a customer, they can verify the customer's identity by transmitting a security question to the user's credit card screen to which the user would then need to respond correctly using the input buttons on the card.

In one embodiment, the credit card of the present invention could also be used to make online purchases. In this embodiment, the card could use RFID or near field technology so that it can connect to a personal computer and be used to uniquely generate a credit card number for online purchases. The number could also, in one embodiment, be displayed on the front LCD of the card. In one embodiment, the card may also be equipped with a means for communicating with the USB port on the computer in connection with making the online purchases.

TABLE 1

What is claimed is:

1. An apparatus for conducting credit transactions comprising:
   a device with the similar dimensions and thickness to a standard credit card
   an inductor assembly integrated into said device capable of generating a programmed magnetic field at a location on the device where it will come into proximity to a standard credit card magnetic-strip reader
   the inductor assembly being operable to be read by a magnetic pickup of an electronic credit card reader;
   at least one auxiliary rate detection units adjacent to said inductor assembly, wherein said at least one auxiliary detection unit is operable to detect a rate at which said device, including said inductor assembly, is passed through said electronic credit card reader; and
   a microprocessor operatively coupled to said inductor assembly and said at least one detection unit, wherein said microprocessor is operable to simulate magnetic-strip data fields using the inductor assembly, at a rate determined from said auxiliary detection units.

2. A method of claim 1, wherein the inductor assembly is a planar coil which is a looped inductor with dimension roughly equal to, and along the axis of, the standard credit-card magnetic strip 3. A method of claim 1, wherein said detection assembly consists of a plurality of motion rate detection units, which may comprise inductor coils and companion magnetic-field pickup coils, each of which is able to detect the proximity of metallic objects, such as magnetic-strip reader heads, passing through the magnetic field created by said inductor and detected by said pickup coil.

4. A method of claim 1, wherein said device may incorporate a plurality of touch sensors arranged along the surface of said device which may;
   allow user input of information,
   allow introducing a transaction specific identifier,
   to confirm/deny transaction information,
   to operate in sequence, or with a gesture across said sensor for the purpose lock/unlock or control access for transactions 5. A method of claim 4, wherein said device contains a real-time clock or counter unit which generates a sequential parameter when the card is read by said credit card reader, and which along with certain user information, transaction identifiers, user secrets, credit card authority secrets is combined to generate a limited-use credit card number, which has a limited recurrence, is limited in scope of use to a predetermined number of authorized transactions 6. A method of claim 5, wherein the time, sequence, user, credit card authority and other information is similarly combined by credit card processing facility to generate a credit card number for comparison to the nmber transmitted by the credit card reader, for the purposes of authenticating said number is from a recognized card used in a user-authorized transaction 7. A method of claim 1, wherein said device incorporates a display allowing credit card number, time, passcodes, sequence codes, amounts and other credit card transaction information to be displayed for user, merchant, bank or credit card authority 8. An apparatus for conducting credit transactions comprising, wherein the edge of said device contains a connector for connection to standard computing devices such as a USB interface.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A payment device comprising:

a thin card-shaped body having a security feature associated with a viewable surface of said thin card-shaped body;

a memory;

a processor coupled to the memory;

an information of an authorized user, an issuer account, and of an issuer, of said payment device;

a payment interface, including at least one interface selected from a set consisting of: a magnetic stripe interface, a smart card interface, an RF interface, an NFC interface, a display interface, and a wireless interface, and wherein the payment interface is operable to generate a payment information of a payment transaction and said payment information comprises limited-use payment information, and wherein further, the limited-use payment information is to be used for payment transactions by an authorized user of said payment device at supported payment facilities, wherein at least a portion of said limited-use payment information is provided by a payment authority for use by the payment device, and wherein the payment authority rejects as invalid any use of said limited-use payment information obtained at any payment facility other than a payment facility receiving said limited-use payment information via the payment interface.

2. The device of claim 1 wherein the security feature associated with the viewable surface of the thin card-shaped body comprises no payment numbers susceptible to a misuse by theft, fixed thereon, and wherein further generation of the limited-use payment information, including that generated by an authorized device connected to the payment device, obviates any need for said payment numbers fixed on said viewable surface.

3. The device of claim 2, wherein the viewable surface comprises fixed information disposed thereon and wherein the fixed information includes: a card-holder name; a payment issuing logo; and a card payment network logo, and wherein further, the viewable surface is free of account numbers, expiration dates, card security codes, or other payment-usable numbers, susceptible to a misuse by theft.

4. The device of claim 2, wherein the payment information conveyed via the magnetic stripe interface is limited to the magnetic stripe interface for the issuer account, wherein further the limited-use payment information is limited to use by the payment device and is operable for conveying payment information to a magnetic-stripe payment card reader, wherein said limited-use payment information has a limited period of valid use, and wherein said limited-use payment information is not valid when used other than at a magnetic stripe payment card reader facility.

5. The device of claim 1, wherein an information unique to said payment device and to an authorized user thereof, is operable to be conveyed to a personal computing device, for generation of an additional limited-use payment information on said personal computing device, and wherein further, the additional limited-use payment information is operable to be used for performing payment transactions at payment facilities with which the payment device is limited in performing.

6. The device of claim 5, wherein a request for payment includes at least one of a set consisting of: payment information, transactional information, merchant information, payment facility information, payment interface information, and payment card reader information, and wherein a card-present transaction is one performed by said authorized user presenting said payment device at a payment reader facility for payment, and wherein a card-not-present transaction is one performed other than when said payment card device is presented for payment at a payment card reader facility; and, wherein a payment processing facility is operable to approve as valid, a use of the limited-use payment information in a card-present payment transaction at supported facilities; and, wherein said payment processing facility is also operable to reject, as invalid, a use of the limited-use payment information in a card-not-present payment transaction; and wherein a payment authority receiving a validation said payment processing facility is operable to decline a payment transaction not approved as valid, and approve a payment transaction as valid, dependent-on said validation of said payment processing facility of said payment transaction.

7. The device of claim 6, wherein the payment processing facility shares at least a portion of a same information used in the limited-use payment information and in the additional limited-use payment information, and wherein further, said payment processing facility is operable to receive said payment information from said payment transaction and to approve or not approve, said payment transaction performed within a valid set of limitations in usage, and wherein further, said payment processing facility limits valid approval based on payment information matching an expected device generated limited-use payment information, and wherein said payment processing facility declines as invalid a use of said limited-use payment information in payment transactions other than supported facility payment transactions, and wherein the personal computing device is configured to receive an authorized user input approving or not approving, the payment transaction, via a user interface disposed of said personal computing device, and wherein the personal computing device is configured to transmit to the payment processing facility, an approval or a denial via a wireless interface disposed of said personal computing device, and wherein the payment processing facility limits as validated use for payment for payment transactions with the authorized user approving, and declines as invalid use when the authorized user is denying an approval.

8. The device of claim 7, wherein said limited-use payment information comprises a dynamically-generated one-time limited-use payment information portion generated by a processor of siad personal computing device when used at a payment facility accessible to said personal computing device, and wherein the payment information conveyed to a payment facility, at a payment transaction time, includes at least one of a portion of: a static limited-use portion; and a dynamically-generated limited-use portion, and wherein at least a portion of said static limited-use portion is provided by the payment authority or a payment processing facility approved by the payment authority, for use by the personal computing device, and wherein a dynamically generated limited-use payment information includes at least one specific information selected from a set consisting of: a payment device specific information, a personal computing device specific information, a user specific information, a merchant specific information.

9. The device of claim 5, wherein a payment processing facility is operable to reject as invalid, a usage of the limited-use payment information, provided by the payment device in card reader facility transactions, when re-used in an online payment transaction, and wherein said payment processing facility is operable to accept as valid a use of the additional limited-use payment information, when generated via the personal computing device, in a valid online payment transaction use, and wherein said additional limited-use payment information combines at least one element selected from a set of unique identifying characteristics consisting of: an identifier of the payment device, an identifier of the personal computing device, an authorized user of the personal computing device, an authorized user of the payment device, a specific merchant for the online payment transaction, an identifier of a specific recipient of the online payment transaction, a sequential counter count of transactions, a limited number of payment uses, and an information specific to the online payment transaction.

10. The device of claim 9, wherein an interface of said personal computing device is operable to wirelessly receive information of the authorized user of the payment device, and wherein said issuer of said payment device is operable to support a payment transaction on the personal computing device after receiving an information of the payment device via the personal computing device, and the authorized user of the payment device is verified on the personal computing device through at least one security challenge, selected from a set consisting of:

a device touch ID sensor identifying a recognized touch of a valid user;

a device touch sensor-array receiving a user entered valid user code;

a device key-pad receiving a user entered valid user code;

a device user interface receiving a user entered valid PIN or Key-Code;

a device user interface receiving a correct answer to a challenge presented on the personal computing device which a valid user would know;

a device user interface receiving a user entered valid password;

a device motion-sensing interface reading a user swipe or gesture;

a user tapping a predetermined sequence on the payment device;

a user motioning the payment device in accordance with a sequence;

a skin-contact sensor identifying a recognized valid user;

a device sensor array reading a touch of an identified user;

a device biometric recognition of a valid user; and a biometric sensing of the payment device remaining continuously in possession of a valid user, whereupon satisfying said at least one security challenge, an information relating to the payment device is operable to be displayed on the personal computing device through a user interface disposed of the personal computing device, including at least one payment device usage information selected from a set consisting of:

a transaction time;

a payment amount;

a merchant information;

a user information;

an online location;

a payment facility;

a payment device user information;

a payment device issuer information;

at least a numerical portion of the issuer account;

a graphical image representation of at least one of the above set of information;

a graphical image representation of the payment device; and wherein upon satisfying said at least one security challenge, a user-interface is operable to receive an input, of at least one user action selected from a set comprising: a selection of said payment device in a payment transaction performed by said personal computing device, a selection of a limitation in a limited-use payment, a payment approval authorization; a payment denial; a review of a previous payment transaction, and an adjustment of a payment transaction, and wherein a display of the personal computing device is operable to convey a status of processing the payment transaction.

11. A payment device comprising:

a thin card-shaped body having a security feature associated with a viewable surface of said thin card-shaped body;

a memory;

a payment issuer account information;

a processor coupled to the memory;

a payment interface, including at least one supported interface selected from a set of interfaces consisting of: a magnetic stripe interface, a smart card interface, an RF interface, an NFC interface, a display interface, and a wireless interface, and wherein the payment interface is operable to convey a payment information of a payment transaction, and comprises limited-use payment information, wherein further an authority in processing of payment transactions is operable to approve as valid a use of the limited-use payment information for payment transactions by an authorized user of said payment device at a limited set of supported payment facilities, and wherein said authority is operable to reject as invalid, a use of the limited-use payment information provided via the payment interface, in payment transactions not at supported payment facilities.

12. The device of claim 11 wherein the security feature associated with the viewable surface of the thin card-shaped body comprises no payment numbers susceptible to a misuse by theft, fixed thereon, and wherein further generating the limited-use payment information, including that generatable by an authorized device connected to the payment device, obviates any need for said payment numbers susceptible to a misuse by theft indicated on said viewable surface.

13. The device of claim 11 wherein the viewable surface comprises a minimized set of payment information disposed thereon, and wherein the set of payment information includes: a card-holder name; a payment issuing logo; and a card payment network logo, and, wherein further, the viewable surface is free of payment account numbers, expiration dates, card security codes, or other numbers susceptible to a misuse by theft.

14. The device of claim 13, wherein the payment information conveyed via the magnetic stripe interface is specifically limited to the magnetic stripe interface, and wherein further the limited-use payment information is limited to use specifically by the payment device and is operable for conveying the payment information to a magnetic stripe payment card reader, and wherein said limited-use payment information has a limited period of valid use, and wherein said limited-use payment information is not valid when used other than at a magnetic stripe payment card reader facility during the limited period of valid use.

15. The device of claim 11, wherein further a payment device information including a unique identifier of said payment device, is operable to be wirelessly conveyed to a personal computing device, for generation of additional limited-use payment information on said personal computing device, and wherein the personal computing device generated additional limited-use payment information is operable to be used in place of the payment issuer account information for performing payment transactions at payment facilities at which the payment device is limited in performing, and wherein further a payment issuer approved authority in processing of payment transactions is operable to approve as valid, a use of said personal computing device generated additional limited-use payment information for valid payment transactions by said personal computing device, at payment facilities in addition to those supported by the payment device.

16. The device of claim 11, wherein a request for payment includes at least one of a set consisting of: payment information, transaction information, merchant information, payment facility information, payment interface information, and payment card reader information, and wherein a card-present transaction includes valid payment card reader facility information receiving said payment information via said payment interface; and, wherein a card-not-present transaction is one including at least a portion of said payment information, and not including valid payment card reader facility information; and, wherein an authority in payment processing is operable to approve or reject a payment transaction, based on an information of the payment transaction, including that of payment facilities involved in the payement transaction; and, wherein said authority is operable to approve as valid, a valid use of the payment device in a card-present payment transaction; and, wherein said authority is operable to reject, as not valid, a use or re-use of the limited-use payment information in a card-not-present payment transaction; and wherein said authority receiving said request for payment is operable to decline a payment transaction not involving a valid card-present use of the limited-use payment information at payment facilities.

17. The device of claim 11, wherein a payment issuer approved authority in the processing of payments is operable store at least a portion of the limited-use payment information, for validating a valid use by the payment device; and, wherein further said authority limits valid approval of said limited-use payment information to perform a card-present payment transaction by the payment device, and wherein said authority declines as invalid a use of said limited-use payment information in payment transactions other than wherein the payment device is present, and wherein said authority limits said limited-use payment information to use for a finite amount of uses, and declines as invalid use when a count of said of uses has been exceeded, and wherein said authority limits use to payment for payment transactions when an authorized user approves, and declines as invalid use when the authorized user denies an approval, and wherein said authority limits said limited-use payment information to a valid use for payments by the payment device.

18. The device of claim 11, wherein an information of the payment device and an authorized user thereof, is operable to be received by a personal computing device, via an interface of said personal computing device, and wherein said personal computing device is operable to identify a valid user for performing payment transactions through at least one user-validation action, selected from a set consisting of:

a device touch ID sensor identifying a touch of the valid user;

a device touch sensor-array receiving a user entered valid user code;

a device key-pad receiving a user entered valid user code;

a device user interface receiving a user entered valid PIN or Key-Code;

a device user interface receiving a user entered valid password;

a device user interface reading a user swipe or gesture;

a user tapping a predetermined sequence on the payment device;

a user motioning the payment device in accordance with a sequence;

a skin-contact sensing identifying a valid user;

a device sensor array reading a touch of an identified user;

a device biometric recognition of a valid user; and a biometric sensing of the payment device remaining continuously in possession of a valid user, wherein a display of the personal computing device is operable to display payment transaction information through a user interface disposed of the personal computing device, including at least one information of a set consisting of:

a transaction time;

a payment amount;

a merchant information;

an user information;

an online location;

a payment facility;

a payment device information;

at least a portion of the payment issuer account information;

an image representational of the payment device; and wherein upon validating the user, a user-interface is operable to receive a valid user input, of at least one user action selected from a set consisting of: a payment information, a user-desired limitation for a payment transaction, a payment approval authorization; a payment denial; and an adjustment of a payment transaction, and wherein the personal computing device is operable to convey a status of processing the payment transaction, on the display of the personal computing device.

19. The device of claim 11, wherein an additional limited-use payment information comprises a dynamically generated limited-use payment information portion generated by a processor of a personal computing device when used at a payment facility accessible to said personal computing device, and wherein the payment information conveyed to a payment facility, at a payment transaction time, includes at least one of a portion of: a static limited-use portion; and a dynamically-generated limited-use portion, and wherein at least a portion of said static limited-use portion is provided by a payment issuer approved authority in the processing of payments for use in place of the payment device by a valid user of the personal computing device, and wherein said dynamically-generated limited-use payment information portion combines at least one specific information selected from a set consisting of: a payment device specific information, a personal computing device specific information, an information supplied by an issuer of payment device, a user specific information, a merchant specific information.

20. A payment card device comprising:

a thin card-shaped body having a security feature associated with a viewable surface of said thin card-shaped body;

a memory;

a processor coupled to the memory;

a near-field tag; and a payment facility interface, including at least one supported interface selected from a set of facility interfaces consisting of: a magnetic-stripe, a smart card reader interface, a display interface, an RF interface, an NFC interface, a wireless interface, a visible information fixed thereon said thin card-shaped body, and wherein an account identifying information for said payment card device is operable to be conveyable to a personal computing device by at least one interface selected from a set consisting of: the set of facility interfaces, and the near-field tag, and wherein a payment information for a payment transaction is operable to be conveyed via the payment facility interface, for payment transactions by said payment card device at a limited set of supported payment facility types, and wherein further the payment information is not valid for performing payment transactions not at supported payment facility types, wherein at least a portion of said payment information comprises limited-use numbers which are limited to valid use at supported payment facility types, and wherein said limited-use numbers are shared with a payment processing facility for recognition by said payment processing facility of valid usage within limitations upon a generation by the payment card device and a generation by said personal computing device, and wherein the payment processing facility rejects as invalid any use of said limited-use numbers obtained at any payment facility other than a payment facility receiving generated limited-use numbers at an expected payment facility.

21. The payment card device of claim 20, wherein the security feature associated with the viewable surface of the thin card-shaped body comprises no payment numbers susceptible to a misuse by theft, fixed thereon, and wherein further generation of the limited-use numbers obviates any need for said payment numbers susceptible to a misuse by theft fixed on said viewable surface.

22. The payment card device of claim 21, wherein a payment processing facility is operable to reject as invalid, an invalid re-use of limited-use numbers provided via a payment reader facility, in an online payment transaction.

23. The payment card device of claim 21, wherein a payment processing facility is operable to reject as invalid, a misuse of limited-use numbers provided via a payment facility other than an expected facility.

24. The payment card device of claim 21, wherein a payment processing facility is operable to approve as valid, a use of the limited-use numbers generated via the personal computing device when used at a payment facility accessible to said personal computing device, at payment facilities in addition to payment facility types to which the payment card device is limited.

* * * * *